United States Patent
Kaminsky et al.

(10) Patent No.: US 6,869,185 B2
(45) Date of Patent: Mar. 22, 2005

(54) DISPLAY SYSTEMS USING ORGANIC LASER LIGHT SOURCES

(75) Inventors: Cheryl J. Kaminsky, Rochester, NY (US); Robert P. Bourdelais, Pittsford, NY (US); Keith B. Kahen, Rochester, NY (US); John A. Lebens, Rush, NY (US); John P. Spoonhower, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 294 days.

(21) Appl. No.: 10/272,548

(22) Filed: Oct. 16, 2002

(65) Prior Publication Data

US 2004/0076203 A1 Apr. 22, 2004

(51) Int. Cl.[7] ............................................. G03B 21/00
(52) U.S. Cl. ........................................ 353/31; 353/122
(58) Field of Search ............................. 353/31, 99, 122, 353/20; 345/48, 84; 359/460

(56) References Cited

U.S. PATENT DOCUMENTS

| | | | |
|---|---|---|---|
| 2,465,319 A | 3/1949 | Whinfield et al. | 526/71 |
| 2,901,466 A | 8/1959 | Kibler et al. | 528/288 |
| 3,903,234 A | 9/1975 | Ikeda et al. | 264/210.6 |
| 4,377,616 A | 3/1983 | Ashcraft et al. | 428/231 |
| 4,420,607 A | 12/1983 | Morris et al. | 528/298 |
| 4,459,402 A | 7/1984 | Morris et al. | 528/298 |
| 4,468,510 A | 8/1984 | Morris et al. | 528/298 |
| 4,632,869 A | 12/1986 | Park et al. | 428/315.5 |
| 4,758,462 A | 7/1988 | Park et al. | 428/213 |
| 5,086,430 A | 2/1992 | Kapon et al. | 372/50 |
| 5,260,729 A * | 11/1993 | Ullah et al. | 353/31 |
| 5,381,502 A | 1/1995 | Veligdan | 385/115 |
| 6,194,119 B1 | 2/2001 | Wolk et al. | 430/200 |
| 6,304,237 B1 | 10/2001 | Karakawa | 345/84 |
| 6,327,083 B1 * | 12/2001 | Goldenberg et al. | 359/453 |
| 2001/0022566 A1 | 9/2001 | Okazaki | 345/84 |
| 2003/0206145 A1 * | 11/2003 | Spoonhower et al. | 345/84 |

OTHER PUBLICATIONS

U.S. Appl. No. 09/832,759, filed Apr. 11, 2001, Kahen et al.
U.S. Appl. No. 10/008,428, filed Nov. 13, 2001, Dontula et al.
U.S. Appl. No. 10/008,810, filed Nov. 13, 2001, Majumdar et al.
U.S. Appl. No. 10/011,040, filed Nov. 13, 2001, Dontula et al.
U.S. Appl. No. 10/066,829, filed Feb. 4, 2002, Kahen.
P. L. Gourley, et al., "Coherent Beams From High Efficiency Two–Dimensional Surface–Emitting Semiconductor Laser Arrays," Appl. Phys. Lett. 58 (9), Mar. 4, 1991, pp. 890–892.
Scott W. Corzine, et al., "Design of Fabry–Perot Surface–Emitting Lasers With A Periodic Gain Structure," IEEE Journal Of Quantum Electronics, vol. 25, No. 6, Jun. 1989, pp. 1513–1524.

* cited by examiner

Primary Examiner—Christopher Mahoney
(74) Attorney, Agent, or Firm—Stephen H. Shaw

(57) ABSTRACT

A display system for providing a user viewable visible image, includes a view screen for receiving organic laser light and having a diffusing optical element so that the view screen, in response to organic laser light, produces a viewable visible image, wherein the diffusing optical element includes a viewing angle greater than 160° in a first viewing direction and greater than 100° in a second viewing direction orthogonal to the first direction; one or more organic laser light sources arranged in an array with each such laser light source including a vertical cavity design and means for projecting and modulating the intensity of the organic laser light from the array onto the view screen in a pattern to cause a visual image to be produced by the view screen; and means associated with the view screen for reducing speckle in the organic laser light.

42 Claims, 8 Drawing Sheets

DISPLAY SYSTEMS USING ORGANIC LASER LIGHT SOURCES

CROSS REFERENCE TO RELATED APPLICATIONS

Reference is made to commonly assigned U.S. patent application Ser. No. 09/832,759 filed Apr. 11, 2001 entitled "Incoherent Light-Emitting Device Apparatus for Driving Vertical Laser Cavity" by Keith B. Kahen et al. and commonly assigned U.S. patent application Ser. No. 10/066,829 filed Feb. 4, 2002 entitled "Organic Vertical Cavity Phase-Locked Laser Array Device" by Keith B. Kahen, the disclosures of which are incorporated herein by reference.

FIELD OF THE INVENTION

The present invention relates to display systems and, more particularly, to display systems that use organic laser light sources.

BACKGROUND OF THE INVENTION

While display devices based upon laser light sources have been known for some time, their performance limitations have presented a barrier to many desirable applications. This is especially true for color display applications where the complexity and cost of using readily available, multiple, independent laser devices precludes large acceptance of these devices. Additionally, although lasers are an ideal light source for such applications from an intensity or brightness perspective, the coherence of the laser light generates speckle that is unpleasant to the viewer.

Display devices based on laser light sources depend upon the generation of multiple wavelengths of light in order to produce a color display. The color is created by appropriately mixing such light sources to achieve a high color quality; the measure of the color range is termed the gamut. Three or more different wavelength sources are commonly used to create a high gamut display. These distinct light sources are projected onto a surface from which the content is viewed. Commonly, two forms of such projection are used. Front-projection refers to the delivery of the multiple wavelengths of light using an optical system in which the delivery occurs to the front surface of the viewing screen. The screen is observed by the viewer in a reflection mode. Rear-projection refers to the situation in which the light is delivered by an optical system to the rear of the viewing screen. In this instance, the light propagates through the screen and is observed by the viewer in a transmission mode.

U.S. Patent Application Publication No. US 2001/0022566 A1, by Okazaki, titled "Color Laser Display Employing Excitation Solid Laser Unit, Fiber Laser Unit, or Semi Conductor Laser Unit," describes the use of three separate lasers to produce the three different wavelengths for a color display. These wavelengths are produced by a variety of inorganic solid state laser devices. These three wavelengths are combined using optical means well known to those versed in the art. Through the use of a galvonometer and rotating mirrors, as well as additional optics, an image is produced upon the viewing screen. The color gamut of this display is dictated by the choice of wavelengths available from such solid state laser sources. In turn, these wavelengths are determined by the solid state material properties, including such properties as the solid state alloy composition, dopant type and composition, etc. In this apparatus, a small mirror is wobbled to reduce the deleterious effects of speckle for the viewer. Solid state laser sources are preferable for their improved electrical power efficiency, reduced size, and lower cost relative to the more commonly employed gas lasers. Additionally, because this apparatus does not obtain its multiple wavelengths needed for the display by employing nonlinear optical means of wavelength conversion, reduced amplitude noise is claimed for this apparatus.

U.S. Pat. No. 6,304,237 by Karakawa, titled "Monochromatic R,G,B Laser Light Source Display System And Method," discloses a display apparatus where the three wavelengths for display are produced by a single pulsed laser which is used to produce three different optical wavelength beams by means of nonlinear wavelength conversion. An Nd:YVO$_4$ crystal with laser output at 1064 nm is used to pump a number of different devices to produce three different visible wavelengths suitable for a display system. Wavelengths in the green, red, and blue portions of the spectrum are produced by nonlinear conversion. For example, Second Harmonic Generation (SHG) in an external optical cavity produces the green wavelength at 532 nm. Various other schemes for producing the other visible wavelengths are described including the use of an Optical Parametric Oscillator (OPO) and Sum Frequency Mixing (SFM). Pulsed lasers are used in order to produce the high optical powers required for such nonlinear optical generation schemes, and to meet the brightness requirements for the display. In some instances an etalon is employed in the external optical cavities used to produce the visible radiation. The etalon is used to generate a multi-longitudinal mode output, which results in the reduction of the coherence of the optical beam. In this way, the undesirable effect of speckle is reduced. The increased amplitude noise generally characteristic of pulsed lasers is not mentioned in this document.

In addition to projection systems where the visible laser light is delivered to the view screen after free propagation, i.e., propagation through an atmosphere or empty space, there exists display systems using visible laser light in which the light is brought to the view screen by waveguide action. U.S. Pat. No. 5,381,502 by Veligdan, titled "Flat or Curved Thin Optical Display Panel," discloses the use of a planar optical waveguide to deliver the laser light to the view screen. In principle, such an apparatus would result in a much thinner display, assuming that the laser light source(s) can be adequately reduced in size.

There are a number of problems with past designs that the current invention overcomes. Inorganic solid state laser devices, although an improvement over gas lasers in terms of cost, reliability, and size, are still costly and relatively large devices, particularly for display applications. This makes the creation of "flat panel" displays based upon these devices difficult to achieve. Clearly it is desirable to reduce the size and complexity of such an apparatus. Furthermore, wavelength selection, in order to realize an optimum color gamut or color range, is limited for inorganic solid state laser sources.

SUMMARY OF THE INVENTION

It is an object of the present invention to provide an improved display system that uses visible laser light sources and overcomes prior art problems, such as presented by inorganic solid state laser devices.

This object is achieved by a display system for providing a user viewable visible image, that includes: a) a view screen for receiving organic laser light and having a diffusing optical element 95 so that the view screen, in response to organic laser light, produces a viewable visible image, wherein the diffusing optical element 95 includes a viewing angle greater than 120° in a first viewing direction greater than and 60° in a second viewing direction orthogonal to the first viewing direction; b) one or more organic laser light sources arranged in an array with each of the laser light sources including a vertical cavity design having: i) a first dielectric stack for receiving and transmitting pump beam light and being reflective to laser light over a predetermined range of wavelengths; ii) an organic active region for receiving transmitted pump beam light from the first dielectric stack and emitting the laser light; and iii) a second dielectric stack for reflecting transmitted pump beam light and laser light from the organic active region back into the organic active region, wherein a combination of the first and the second dielectric stacks and the organic active region produces the laser light; c) means for projecting and modulating intensity of the organic laser light from the array onto the view screen in a pattern to cause a visual image to be produced by the viewscreen; and d) means associated with the viewscreen for reducing speckle in the organic laser light.

A feature of the present invention is the use of visible laser devices based upon vertical cavity organic laser light sources incorporating high reflectance dielectric multilayer mirrors for both the top and bottom dielectric stacks and having the active material composed of small molecular weight organic material. A consequence of the very low threshold for this vertical laser cavity design is that it is unnecessary to use high power density pump beam devices (i.e., focused laser light) in order to cause the organic cavity to laser. As a result, low power density devices, such as that produced by unfocused light emitting diode (LED) radiation, are sufficient light sources for pumping the laser cavities. Combining an organic-based laser cavity with an LED pump source results in an inexpensive and versatile laser light source whose light output can be tuned over a large wavelength range. This enables the fabrication of displays with low cost, high color gamut, reduced complexity, and high reliability to be produced from a design where the laser light source is scalable and may be patterned.

BRIEF DESCRIPTION OF THE DRAWINGS

In the detailed description of the preferred embodiments of the invention presented below, reference is made to the accompanying drawings.

DETAILED DESCRIPTION OF THE INVENTION

A display system 1 for providing a user viewable visible image is described that uses LED-pumped organic laser microcavity technology. Microcavity lasers with organic active media (gain media) may be used singly or patterned with necessary drive electronics onto a linear array structure. The microcavity lasers are designed with different organic gain media in order to produce devices that emit light with different visible wavelengths. The linear array length and microcavity laser density are such as to produce a high resolution projection display when the laser light is imaged onto a view surface. A single linear array emitting device is imaged to produce either a row or a column of color pixels in the viewed area. The image of the linear array is scanned across the viewed area by means of a single scan device or multiple scan devices to produce a full image in the viewed area.

Figure 1:
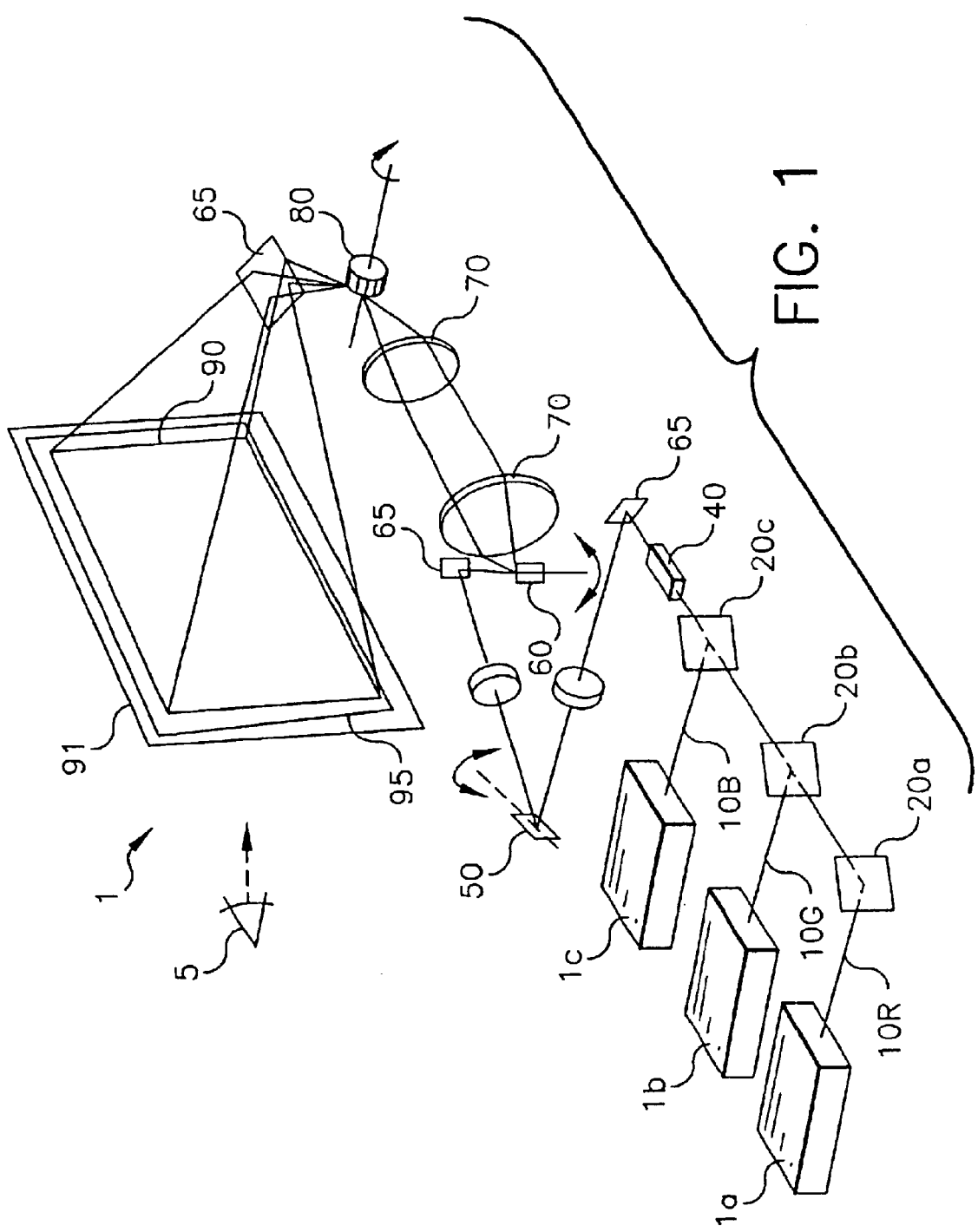
FIG. 1 illustrates a schematic diagram of a display system made in accordance with an embodiment of the present invention.

FIG. 1 illustrates a schematic view of a display system 1 in which three separate organic laser devices 1a, 1b, and 1c are combined and illuminates a view screen 90 in a display 91 that can be observed by a viewer 5. A red organic laser device 1a, a green organic laser device 1b, and a blue organic laser device 1c, produce three different optical wavelengths that when combined produce a color output. The construction of these organic laser devices 1a, 1b, and 1c is shown in more detail in FIG. 7. The way to modulate the intensity of the light from the organic laser devices 1a, 1b, and 1c is provided by the device itself through varying the pump beam's intensity level. This modulation is accomplished by varying the electrical current supplied to the pump LED for the organic laser device. Because each wavelength's intensity can be independently controlled, both the brightness and color of the view screen 90 can be precisely controlled. In this way, a user viewable visible image can be created on the view screen 90. The three light beams (10R, a red light beam; 10G, a green light beam; and 10B, a blue light beam) are combined by the reflecting elements which may be mirrors or light beam reflectors depicted as elements 20a, 20b, and 20c, respectively, to produce a single beam of light. Again, the brightness and color of this beam is controlled by the means sited above. Red light beam reflector 20a is optimized to reflect light of red wavelengths, while dichroic mirror 20b transmits red light wavelengths and reflects green light wavelengths. Similarly, dichroic mirror 20c transmits red and green wavelengths, and reflects blue wavelengths. The production of such reflectors and dichroic mirrors is well known to those skilled in the art. An electrooptic deflector 40 can be used to modulate the position of the combined light beam and correct for unevenness in the pitch of the final raster beam on the view screen 90. As depicted in FIG. 1, elements 65 are optical mirrors of conventional design with broadband wavelength response. The combined beam is slightly deflected or "dithered" by wobble mirror 50 in order to reduce speckle in the final image when viewed on the view screen 90. The necessity for means to reduce the speckle is a consequence of the use of coherent laser light sources. Other alternative means to reduce the effects of speckle are known in the art including the use of a diffusing optical element 95 in or near the view screen 90. Dithering or oscillating the position of the diffusing optical element 95 produces the desired reduction of speckle. Speckle reduction can also be achieved by moving an optical mirror relative to the display system. The use and construction of such diffusing elements is well known to those versed in the art.

The term "diffuser" means any material that is able to transform specular light (light with a primary direction) to a diffused light (light with random light direction). The term "light diffusion elements" means any element that is able to transform specular light (light with a primary direction) to a diffused light (light with random light direction). The term "light" means visible light. The term "diffused light transmission" means the percent of diffused transmitted light at 500 nm as compared to the total amount of light at 500 nm of the light source. The term "total light transmission" means percentage of light transmitted through the sample at 500 nm as compared to the total amount of light at 500 nm of the light source. This includes both spectral and diffused transmission of light. The term "diffusion efficiency" and "haze" means the ratio of percent diffused transmitted light at 500 nm to percent of total transmitted light at 500 nm multiplied by a factor of 100. "Transparent" means a film with total light transmission of 80% or greater at 500 nm.

The term "polymeric film" means a film comprising polymers. The term "polymer" means homo- and co-polymers. The term "average," with respect to lens size and frequency, means the arithmetic mean over the entire film surface area. "In any direction," with respect to lenslet arrangement on a film, means any direction in the x and y plane. The term "pattern" means any predetermined arrangement whether regular or random. The term "microbead" means polymeric spheres typically synthesized using the limited coalescence process. The term "substantially circular" means a geometrical shape where the major axis is no more than two times the minor axis.

"Macro diffusion efficiency variation" means a diffusion efficiency variation that is greater than 5% between two locations that are separated by at least 2 cm. An optical gradient is a change in optical properties such as transmission, reflection, and light direction as a function of distance from a starting point. Useful examples of an optical gradient include a light transmission gradient, a light diffusion gradient, and light absorption gradient. "Gradient," in reference to diffusion, means the gradual increasing or decreasing of diffusion efficiency relative to distance from a starting point.

Figure 9:
FIG. 9 displays a complex lens diffusing optical element 95 with a substrate.
Figure 10A:
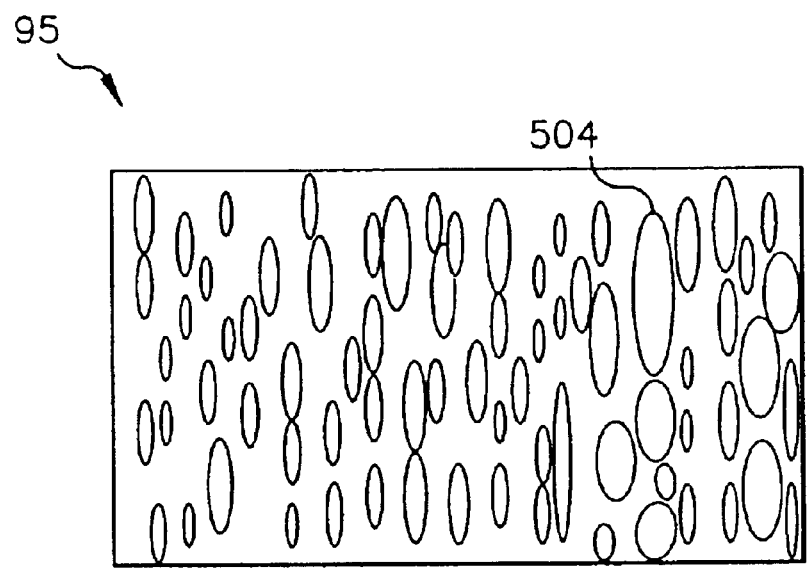
FIG. 10a displays a top view of asymmetric polymeric beads as diffusing optical element 95s with a substrate.
Figure 10B:
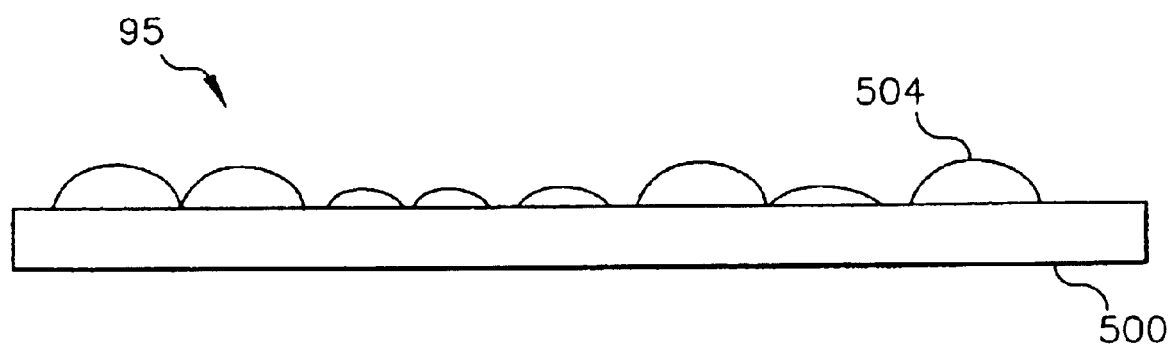
FIG. 10b displays a cross-section view of asymmetric polymeric beads as diffusing optical element 95s with a substrate.

One possible method for the construction of a diffusing optical element 95 is to coat a beaded layer onto the view screen 90 (shown in FIGS. 10a and 10b). If, for example, the view screen 90 consists of a polyester support such as poly(ethylene terephthalate), then a thin coating of approximately 20 micrometer beads thick suffices to produce significant diffusion of the laser light. Such beads can be fabricated from polymers such as poly(methyl methacrylate-cobutyl acrylate), ethylene dimethacrylate, or hydroxyethyl methacrylate. Alternatively, roughened surfaces are known to diffuse the laser light; such surfaces can be produced by mechanical means such as stamping, etc. This combination of elements would create a display apparatus for receiving organic laser light and having a diffusing element so that the display, in response to organic laser light, produces a viewable visible image of high quality. The diffusing optical element 95 is more clearly shown in FIGS. 9–13.

Galvanometer mirror 60 deflects the combined light beam in the horizontal direction. After passing through the additional optical components in the light beam path, the motion of galvanometer mirror 60 causes vertical displacement of the light beam on the view screen 90. The combined laser light beam passes through an optical system, typically comprised of lenses 70, and illuminates a rotating polygon mirror 80. The rotating polygon mirror 80 projects organic laser light from the array, a line at a time, onto the view screen 90 in a pattern to cause a visual image to be produced by the view screen 90. The rotating polygon mirror 80 causes the horizontal displacement of the combined light beam on the view screen 90. The optical and electronic components exclusive of the view screen 90 can be incorporated into an external projector system creating a front-projection display apparatus, or incorporated into a design where the view screen 90 is illuminated from the rear. Although a rotating polygon mirror 80 is described as the means for scanning the organic laser light onto the view screen 90, it is well known to those skilled in the art that alternative means for scanning could be used. These alternative means include acousto-optic or electro-optical beam deflectors, and micromechanical devices such as digital micromirrors or micrograting deflectors.

Figure 2:
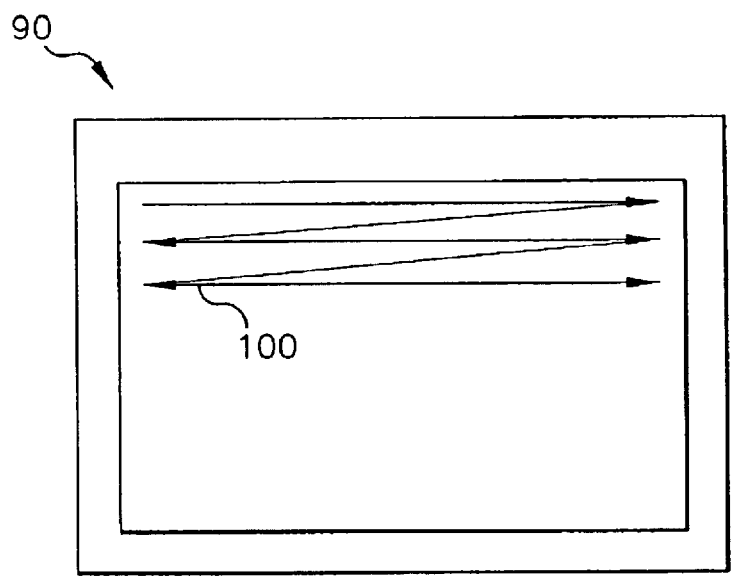
FIG. 2 illustrates raster scanning the mixed color light onto a view screen of the display system of FIG. 1.

In FIG. 2, the laser beam path 100 on the view screen 90 is depicted for the apparatus of FIG. 1. The light from the combined lasers is horizontally scanned from the upper left corner of the view screen 90 to the upper right corner. This motion of the light beam is depicted by the horizontal solid arrow in the figure. The light beam is then reset to the original horizontal position, but displaced vertically downward by the action of galvanometer mirror 60 to create the next line of the display. During this reset, the light beam is turned off by the direct reduction of the current to the organic laser devices 1a, 1b, and 1c. This event is depicted by the dotted line in the FIG. 2. Another horizontal scan then occurs. In this way, an image is built up for the viewer 5 on the view screen 90.

Figure 3:
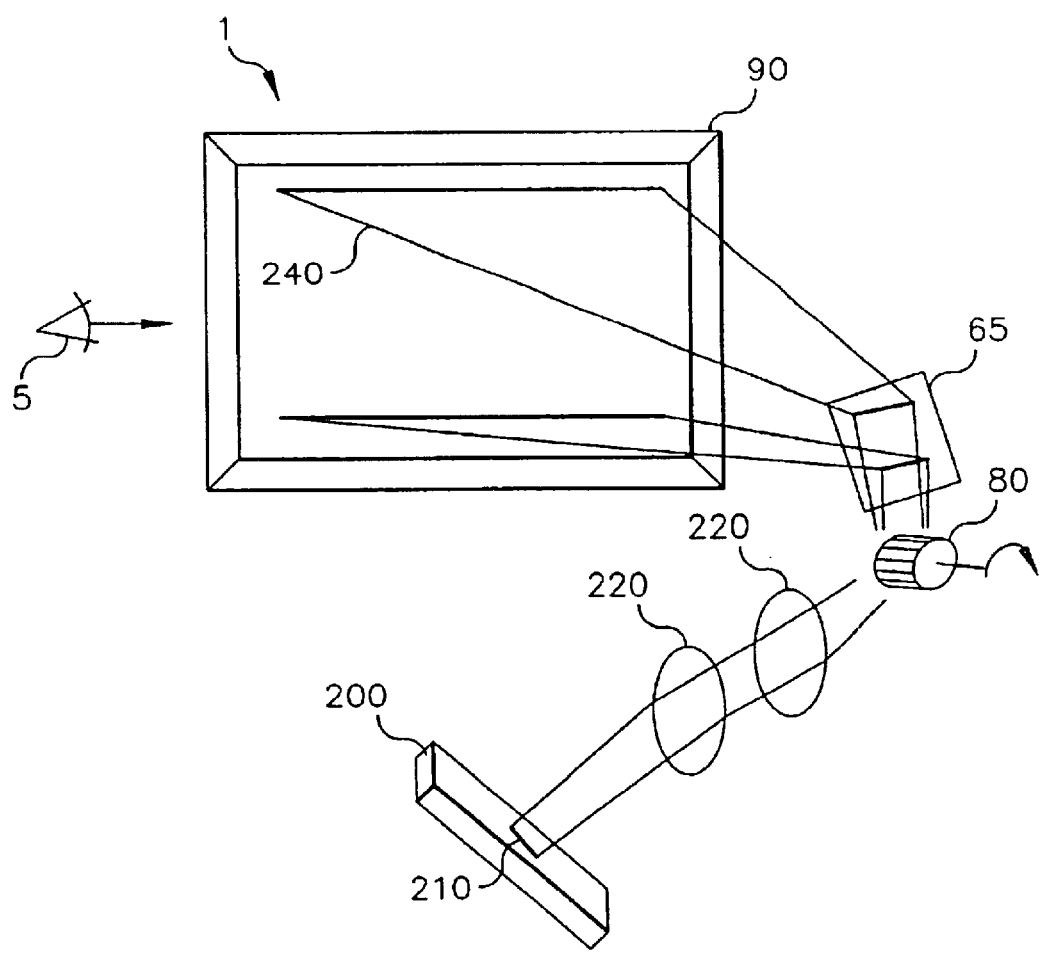
FIG. 3 illustrates a schematic view of a display system made in accordance with another embodiment of the present invention.

A method to reduce the cost, size, and complexity of such a display apparatus is depicted in FIG. 3. This figure illustrates a schematic view of a display system 1 in which a plurality of different organic laser light sources are arranged in an array with each such laser light source being independently controlled by drive electronics that are not shown. A linear laser array 200 creates light from multiple independent organic microcavity lasers. In the example described here, three different organic laser light sources are described, but there may be instances where to create a higher color gamut, light at more than three wavelengths may be produced. In FIG. 3 a line of activated laser array pixels 210 is depicted. This line source of light is produced by simultaneously electrically driving the independent microcavity organic laser light sources. The light is manipulated by optical system components 220 and directed onto a rotating polygon mirror 80. The rotation of this mirror 80 causes a vertical displacement of the image 240 of the line of activated laser array pixels on the view screen 90. Essentially an entire line is written to the view screen 90 simultaneously. The next line is written, vertically displaced from the first. The image is composed line-by-line at a rate where the viewer 5 perceives only the entire image. FIG. 3 depicts the case where the first and last lines of the image only are displayed. Optional optical mirrors 65 can aid in the writing of the image 240 upon the view screen 90. For this display system 1, the need for optical and electronic components necessary for the precision movement of the combined light beam from FIG. 1 in the horizontal direction has been eliminated by the use of the linear laser array 200. The linear laser array 200 may be designed in such a manner to be easily removed and thus facilitate replacement in the event of a failure or the desire on the consumer's part for some improvement in the display capability, like increased resolution, additional color gamut, etc. The resolution of the display in this embodiment is determined by the scan resolution of the raster system for the vertical dimension and by the organic laser pixel sizes of the laser array for the horizontal dimension.

Figure 4:
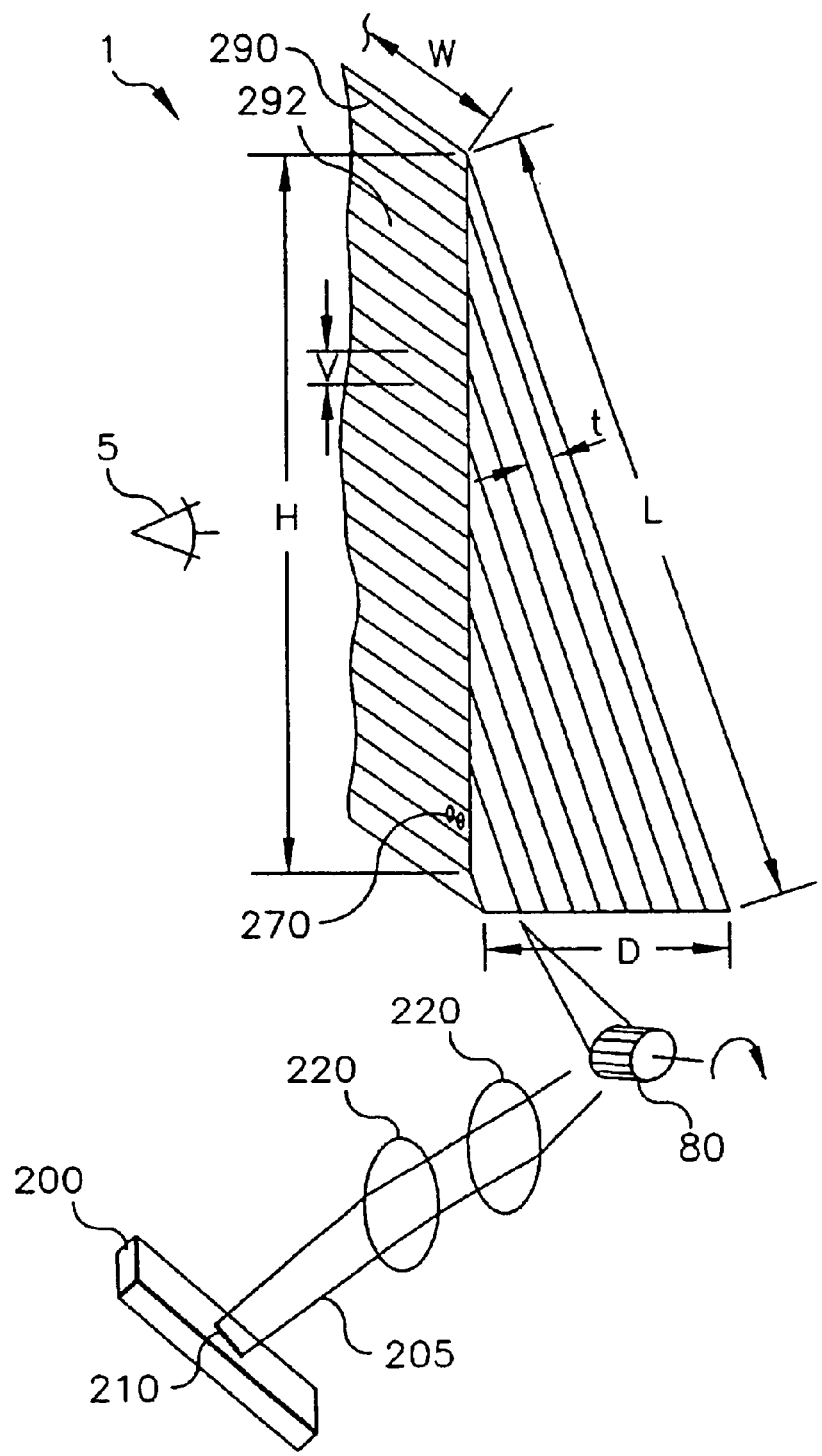
FIG. 4 illustrates a schematic view of an alternate display system made in accordance with another embodiment of the present invention, which uses a waveguide structure.

In FIG. 4 a schematic view of an alternate display system made in accordance the present invention is shown. The waveguide display component 290 in this display system 1 is more fully described in U.S. Pat. No. 5,381,502 by Veligdan. In this patent, Veligdan discloses the use of a planar optical waveguide assembly and provides a detailed description of its operation. Similar to the embodiment described in FIG. 3, a linear laser array 200 creates light from multiple independent organic microcavity lasers. In the example described here, three different organic laser light sources are described, but there may be instances where to create a higher color gamut, light at more than three wavelengths may be produced. In FIG. 4 the line of activated laser array pixels 210 is depicted. This line source of light is produced by simultaneously electrically driving the independent microcavity organic laser light sources. The light 205 is manipulated by optical system components 220 and directed onto a rotating polygon mirror 80. The rotating polygon mirror 80 directs the line of organic laser light sources onto the bottom of waveguide display component 290. The waveguide display component 290 consists of layers of optically transparent material in which the index of refraction alternates between relatively high and low values. These layers of thickness t, serve to trap and guide the organic laser light to the viewable portion of the display system 1 that has height H. The waveguide display component 290 effectively establishes a relationship between rows along the bottom of this component and viewable vertical rows of height V. Different vertical rows of the viewable portion of the display system 1 are addressed as the rotating polygon mirror 80 rotates through its angular range and organic laser light impinges onto the various planar waveguide layers corresponding to different distances along the bottom thickness D of the waveguide display component 290. FIG. 4 also depicts an image of laser array pixels 270 on the surface of the view screen 90. FIG. 4 shows a plurality of waveguides 292 that comprise the waveguide display component 290 that direct light to the view screen 90. The layers of waveguide display component 290 serve to constrain the vertical extent of the image of the laser array pixels 270. For each waveguide 292, light from a particular organic laser pixel is confined by total internal reflection. The horizontal extent of the image of the laser array pixels 270 is not constrained by the waveguide display component 290. The horizontal extent of this image is dictated by the amount of diffraction and size of the organic laser pixels and also by effects such as scattering in the waveguide layer. Thus, the resolution of the display in this embodiment is partly determined by the thickness of the layers t in the structure of the waveguide display component 290, and by the properties of the laser array 200. Although both FIG. 3 and FIG. 4 depict the placement of the rotating polygon mirror 80 after the laser light 205 has traversed the optical systems components 220 (a so-called post-objective scanner) it is to be understood that the placement of the rotating polygon mirror 80 could occur prior to the optical systems components 220 (a so-called pre-objective scanner).

Figure 5:
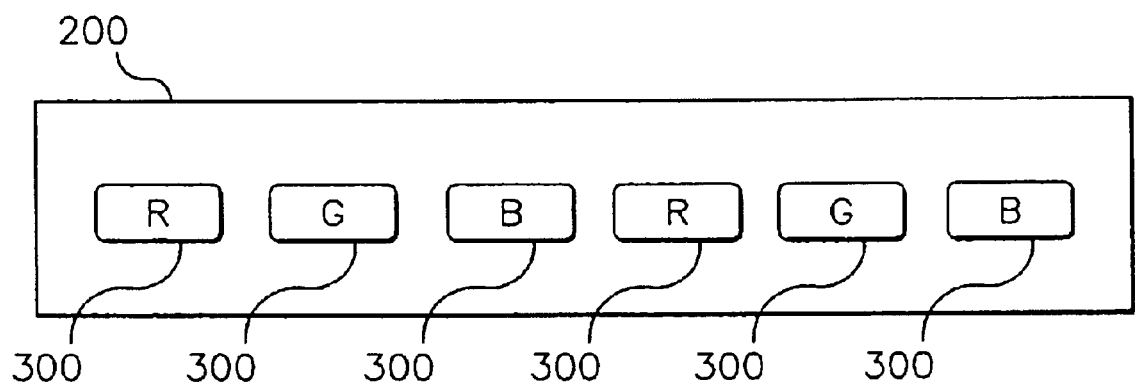
FIG. 5 is a schematic view of a linear laser array.

FIG. 5 is a schematic view of a linear laser array 200. In this case a plurality of different organic laser light sources arranged in a linear array is shown. The pattern shown demonstrates repeating red (R), green (G), and blue (B) organic laser devices. Each organic laser device 300 is an organic microcavity device. The patterning of these devices creates an integrated assembly of laser emitters for delivery of light to the view screen 90 of the display system 1. Each super-pixel (combined red, green, and blue pixels) viewed in the view screen 90 is defined by three laser light sources respectively producing red, green, and blue light.

Figure 6:
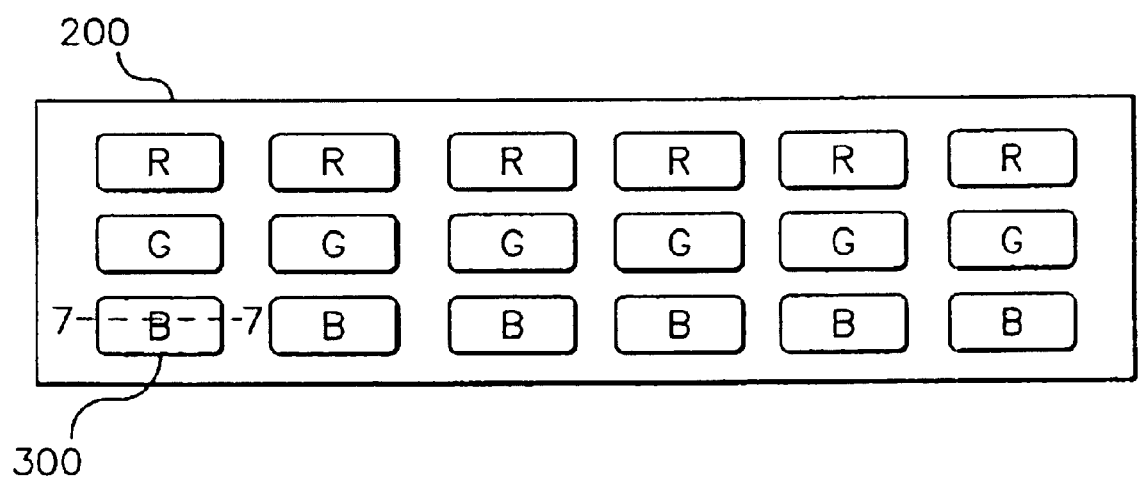
FIG. 6 illustrates a schematic view of another linear laser array.

FIG. 6 is a schematic view of an alternative linear laser array 200. In this case three linear arrays of laser emitters have been integrated into a single assembly. The array includes three separate linear arrays, with each linear array having a plurality of laser light sources producing the same color. Again, each organic laser device 300 is an organic microcavity device. Each pixel viewed in the view screen 90 is defined by three laser light sources respectively producing red, green, and blue light. In this case the three sources are vertically grouped. Clearly, other spatial arrangements of the organic laser devices 300 are possible. The desired system characteristics of the display apparatus dictate the optimum spatial arrangement of these organic laser devices 300.

Figure 7:
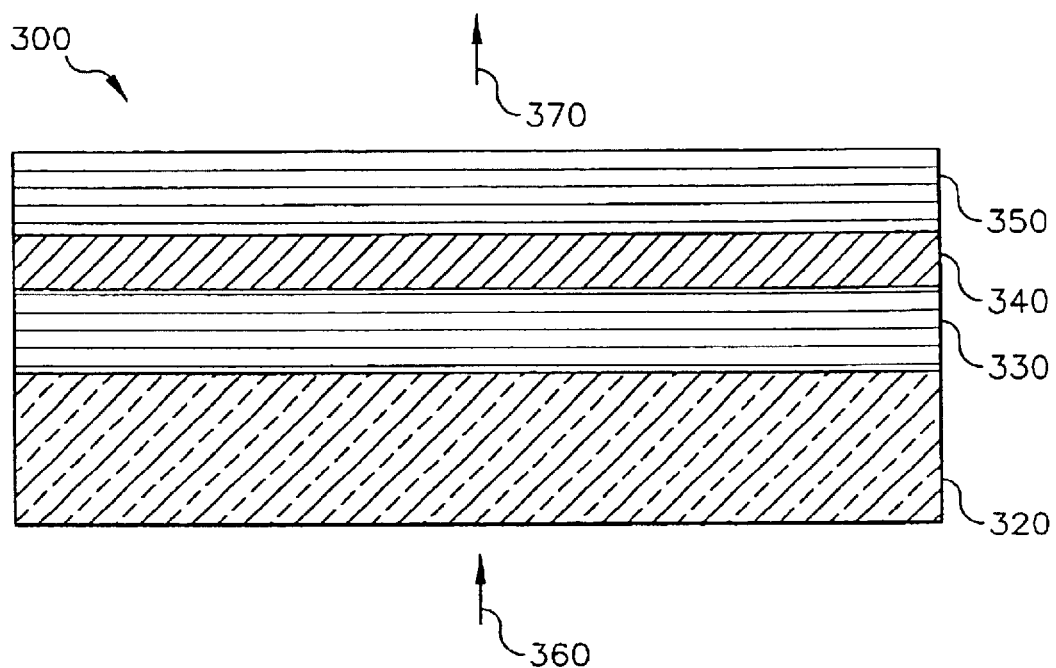
FIG. 7 illustrates a schematic view of a laser light source depicted in FIG. 1 and FIG. 7 and which is part of a laser array.

FIG. 7 illustrates a schematic view of a single organic laser device 300. FIG. 7 depicts a cross-sectional view of the organic laser device 300 along the line 7—7 displayed in FIG. 6. It is an advantage of the present invention to use a vertical cavity design incorporating high reflectance dielectric multilayer mirrors for both the top and bottom reflectors and to have the active material composed of small molecule organic material. As a result, the laser cavity has a very low threshold for laser action. This is a consequence of: 1) the small active volume; 2) the usage of very low-loss, high-reflectivity dielectric mirrors; 3) the lasing medium being composed of small molecule organic materials which can be deposited very uniformly over the bottom dielectric stack; and 4) the lasing medium being composed of a host organic material (absorbs the pump beam radiation) and a small volume percentage dopant organic material (emits the laser light) which results in a high quantum efficiency and low scattering/absorption loss. The consequence of the very low threshold for the vertical cavity is that it is unnecessary to use high power density devices (focused laser light) in order to cause the cavity to lase. As a result, low power density devices, such as, unfocused organic light emitting diode (OLED) radiation or radiation from inorganic light emitting diodes (LEDs), are sufficient light sources to be used for pumping the laser cavities. Combining an organic-based laser microcavity with an LED pump source results in an inexpensive and versatile laser source whose light output can be tuned over a large wavelength range. This is especially critical for the production of high quality, high color gamut displays.

Still referring to FIG. 7, the substrate 320 can either be light transmissive or opaque, depending on the intended direction of optical pumping and laser emission. Light transmissive substrates 320 may be transparent glasses or plastics. Alternatively, opaque substrates including, but not limited to, semiconductor materials (e.g., silicon) or ceramic materials may be used in the case where both optical pumping and emission occur through the same surface. On the substrate 320 is deposited a bottom dielectric stack 330 (also referred to as a first dielectric stack) followed by an organic active region 340. A top dielectric stack 350 (also referred to as a second dielectric stack) is then deposited. A pump beam 360 optically pumps the vertical cavity organic laser device 300. The source of the pump beam may be incoherent, such as, emission from an LED. Alternatively, the pump beam may originate from a coherent laser source. FIG. 7 shows laser emission 370 from the top dielectric stack 350. Alternatively, the laser could be optically pumped through the top dielectric stack 350 with the laser emission through the substrate 320 by proper design of the dielectric stack reflectivities. In the case of an opaque substrate 320, such as silicon, both optical pumping and laser emission occur through the top dielectric stack 350.

The bottom and top dielectric stacks 330 and 350, respectively, are preferably deposited by conventional electron-beam deposition and are composed of alternating high index and low index dielectric materials, such as, $TiO_2$ and $SiO_2$, respectively. Other materials, such as $Ta_2O_5$ for the high index layers, could be used. The bottom dielectric stack 330 is deposited at a temperature of approximately 240° C. During the top dielectric stack 350 deposition process, the temperature is maintained at around 70° C. to avoid melting the organic active materials. In an alternative embodiment of the present invention (not shown), the top dielectric stack 350 is replaced by the deposition of a reflective metal mirror layer. Typical metals are silver or aluminum, which have visible light reflectivities in excess of 90%. In this alternative embodiment, both the pump beam 360 and the laser emission 370 would proceed through the substrate 320. Both the bottom dielectric stack 330 and the top dielectric stack 350 are reflective to laser light over a predetermined range of wavelengths. It has been found by experimentation that in order to obtain lasing peaks with full widths at half-maximum (FWHM) less than 1 nm, it is necessary to have the reflectances of both the top and bottom dielectric stacks be greater than 99% at the laser emission wavelength.

Figure 8:
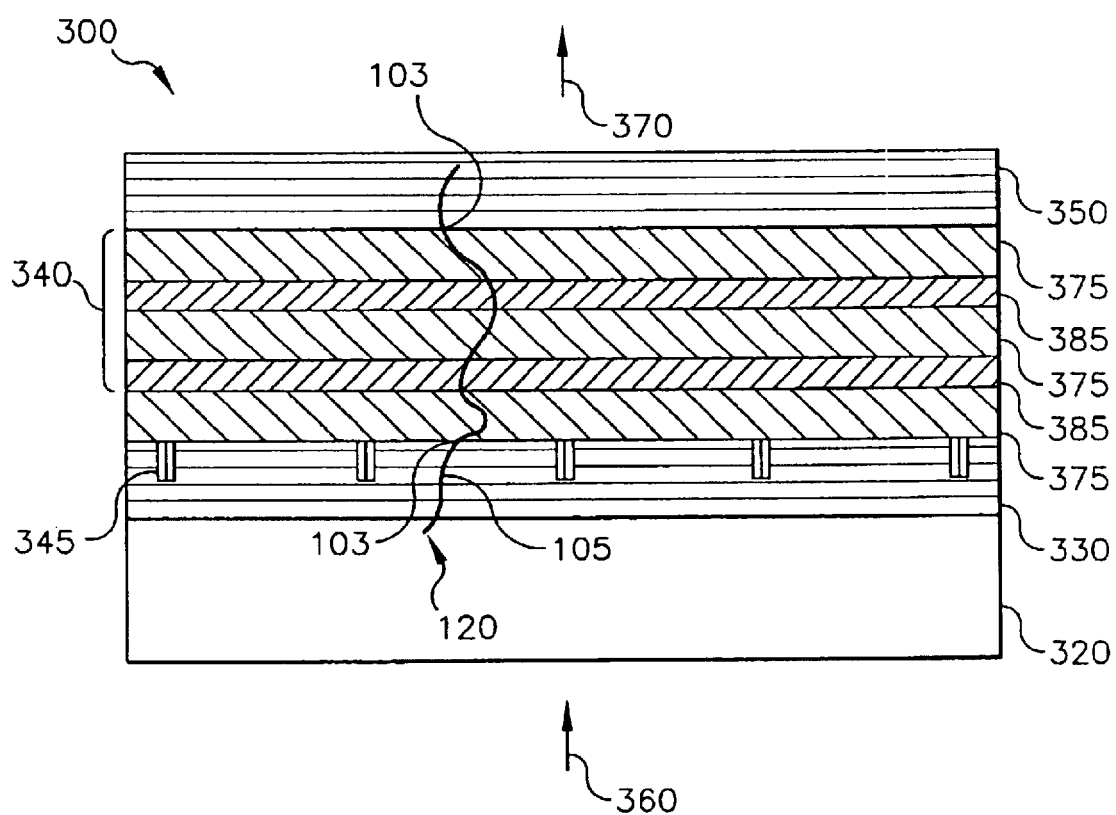
FIG. 8 displays a schematic view of an alternative design of the laser light source.

The operation of a vertical cavity design, incorporating high reflectance top and bottom dielectric stacks, can be improved by having the gain region(s) placed at the antinodes of the cavity's standing electromagnetic wavefield. As a result, the power conversion efficiency is improved, the lasing threshold is lowered, and unwanted output due to spontaneous emission is significantly reduced. FIG. 8 is a side view schematic of the vertical cavity organic laser device 300 with a more detailed view of the organic active region 340. The organic active region 340 includes one or more periodic gain regions 385 and organic spacer layers 375 disposed on either side of the periodic gain regions 385 and arranged so that the periodic gain regions 385 are aligned with the antinodes 103 of the device's standing wave electromagnetic field 120. Since stimulated emission is highest at the antinodes 103 and negligible at the nodes 105 of the electromagnetic field, it is inherently advantageous to form the organic active region 340 as shown in FIG. 8. The placement of the periodic gain region(s) 385 is determined by using the standard matrix method of optics (see Scott W. Corzine et al. IEEE Journal Of Quantum Electronics, Vol. 25, No. 6, June 1989). The spacer layers 375 do not undergo stimulated or spontaneous emission and largely do not absorb either the laser emission 370 or the pump beam 360 wavelengths. An example of a spacer layer 375 is the organic material 1,1-Bis-(4-bis(4-methyl-phenyl)-amino-phenyl)-cyclohexane (TAPC). TAPC works well as the spacer material since it largely does not absorb either the laser emission 370 or the pump beam 360, in addition, its refractive index is slightly lower than that of most organic host materials. This refractive index difference is useful since it helps in maximizing the overlap between the electromagnetic field antinodes 103 and the periodic gain region(s) 385. Employing periodic gain region(s) 385 instead of a bulk gain region(s) results in higher power conversion efficiencies, lowered lasing thresholds, and a significant reduction of the unwanted spontaneous emission.

The preferred material for the periodic gain region(s) 385 is a small molecular weight organic host-dopant combination typically deposited by high-vacuum thermal evaporation. These host-dopant combinations are advantageous since they result in very small unpumped scattering/absorption losses for the gain media. It is preferred that the organic molecules be of small molecular weight since thermally evaporated layers can be deposited more uniformly. The host materials used in the present invention are selected from any materials that have sufficient absorption at the pump beam 360 wavelength and are able to transfer a large percentage of their excitation energy to the dopant material via Forster energy transfer. Those skilled in the art are familiar with the concept of Forster energy transfer, which involves a radiationless transfer of energy between the host and dopant molecules. An example of a useful host-dopant combination for red emitting layers is Alq [aluminum tris (8-hydroxyquinoline)] as the host material and 1% DCJTB [4-(dicyanomethylene)-2-t-butyl-6-(1,1,7,7-tetramethyljulolidyl-9-enyl)-4H-pyran] as the dopant. Other host-dopant combinations can be used for other wavelength emissions, such as in the green and blue parts of the visible spectrum. Other organic gain region materials can be polymeric substances, e.g., polyphenylenevinylene derivatives, dialkoxy-polyphenylenevinylenes, poly-para-phenylene derivatives, and polyfluorene derivatives, as taught by Wolk et al. in commonly assigned U.S. Pat. No. 6,194,119 (Feb. 27, 2001), titled "Thermal Transfer Element And Process For Forming Organic Electroluminescent Devices," and referenced herein. It is the purpose of the organic active region 340 to receive transmitted pump beam light 360 and emit laser light.

It is an advantage of the present invention to provide two-dimensional organic laser array devices employing micron-sized laser pixels which can be either electrically or optically driven by large area sources and produce phase-locked laser output. The devices employ a microcavity design incorporating high reflectance dielectric stacks for both the top and bottom reflectors; and have a gain media including small molecular weight organic material. The micron-sized laser pixels of the device are created by modulating the reflectance of the bottom dielectric stack. The emission from the pixels is phase-locked which enables the device to be driven by a large area source while the laser output remains single mode (or at most, a few lateral modes). Combining low power density thresholds with pumping by large area sources enables the devices to be optically-driven by inexpensive incoherent LED's. Because the light output from such pixels can be designed to be multi-mode (lateral), the coherence of the light source is reduced. Therefore, the undesirable effects of speckle in the display are reduced as well. To obtain phase locking, intensity and phase information must be exchanged amongst the pixels. This is best obtained by weakly confining the laser emissions to the pixel regions by either small amounts of built-in index or gain guiding. As applied to two-dimensional inorganic laser arrays, a route for obtaining this weak confinement was to modulate the reflectance of the top dielectric stack 350 by either adding metal (see Kapon et al., U.S. Pat. No. 5,086,430 issued Feb. 4, 1992, titled "Phase-Locked Array Of Reflectivity-Modulated Surface-Emitting Lasers) or by deep etching into the top dielectric stack 350 (see P. L. Gourley et al., Appl. Phys. Lett. 58, (9), Mar. 4, 1991). Intensity modulating means can include the use of an electro-optic modulator or an acousto-optic modulator. These modulators are well known in the art and are not shown herein. In both inorganic laser array cases, the laser pixels were on the order of 3–5 $\mu$m wide (so as to enable single mode action) and the inter-pixel spacing was 1–2 $\mu$m. Applying these results to organic laser systems requires some care since it is very difficult to perform micron-scale patterning on the laser structure once the organic layers have been deposited. As a result, in one embodiment the reflectance modulation was affected by patterning and forming an etched region 345, as shown in FIG. 8, in the bottom dielectric stack 330, using standard photolithographic and etching techniques, thus forming a two-dimensional array of circular pillars on the surface of the bottom dielectric stack 330. In one embodiment, the shape of the laser pixels was circular; however, other pixel shapes are possible, such as, rectangular. The inter-pixel spacing is in the range of 0.25 to 4 $\mu$m. Phase-locked array operation also occurs for larger inter-pixel spacings; however, it leads to inefficient usage of the optical-pumping energy. Following the inorganic lead and etching deeply into the bottom dielectric stack 330 in order to significantly lower the inter-pixel reflectivity is not a preferred route since it would lead to significant modulation of the active region position. A preferred method is to make a shallow etch from 50 to 400 nm deep to form etched region 345, and make use of the condition that lasing only occurs for wavelengths whose round-trip phase is an integer multiple of $2\pi$. As an example for red laser arrays, the lasing wavelength was chosen to be 660 nm. By removing odd multiples of layers (e.g., one $SiO_2$ layers or 2 $SiO_2$ layers and a $TiO_2$ layer) from the bottom dielectric stack 330, it was calculated (see Scott W. Corzine et al., IEEE Journal Of Quantum Electronics, Vol. 25, No. 6, June 1989) that the lasing wavelength in the inter-pixel regions would be pushed as far as possible from 660 nm (~610 and 710 nm). In doing this it was found that the lasing and spontaneous emission signals in the 710 nm region are very small. Further, it was determined that by etching a few tens of nanometers deeper into the next $TiO_2$ layer, the short wavelength resonance condition would be pushed into the 590 nm wavelength region. In this wavelength region the dielectric stack reflectivity is significantly lower (which would impede any unwanted lasing) and the gain media's fluorescence strength is much reduced (which would impede any unwanted spontaneous emission). Hence, lasing action is prevented and spontaneous emission is significantly reduced in the inter-pixel regions by etching just beyond a couple of odd multiples of layers in the bottom dielectric stack 330.

In one embodiment of the invention, the diffusing optical element 95 is a film having a textured surface on at least one side, in the form of a plurality of random microlenses, or lenslets. The term "lenslet" means a small lens, but for the purposes of the present discussion, the terms lens and lenslet may be taken to be the same. The lenslets overlap to form complex lenses. "Complex lenses" means a major lens having on the surface thereof multiple minor lenses. "Major lenses" mean larger lenslets that the minor lenses are formed randomly on top of. "Minor lenses" mean lenses smaller than the major lenses that are formed on the major lenses. The term "concave" means curved like the surface of a sphere with the exterior surface of the sphere closest to the surface of the film. The term "convex" means curved like the surface of a sphere with the interior surface of the sphere closest to the surface of the film. The term "top surface" means the surface of the film farther from the light source. The term "bottom surface" means the surface of the film closer to the light source. FIG. 9 shows the complex lens diffusing optical element 95 with a substrate 500 and complex lenses 502. The substrate 500 has a total transmission greater than 85 percent.

The "specular area" of the printed projection media is defined as where most of the light passing through that area of the media is transmitted specularly (not diffused). The haze value of light transmitted through this area is typically less than 30%. The "diffused area" of the printed projection media is defined as where most of the light passing through that area of the media is diffusely transmitted. The haze value of light transmitted through this area is typically greater than 70%. "Printed projection media" in reference to the projection media means the projection media after it has been subjected to heat and/or pressure to partially or fully melt the light diffusing elements.

The surface of each lenslet is a locally spherical segment, which acts as a miniature lens to alter the ray path of energy passing through the lens. The shape of each lenslet is "semi-spherical" meaning that the surface of each lenslet is a sector of a sphere, but not necessarily a hemisphere. Its curved surface has a radius of curvature as measured relative to a first axis (x) parallel to the transparent polymeric film and a radius of curvature relative to second axis (y) parallel to the transparent polymeric film and orthogonal to the first axis (x). The lenses in an array film need not have equal dimensions in the x and y directions. The dimensions of the lenses, for example length in the x or y direction, are generally significantly smaller than a length or width of the film. "Height/Diameter ratio" means the ratio of the height of the complex lens to the diameter of the complex lens. "Diameter" means the largest dimension of the complex lenses in the x and y plane. The value of the height/diameter ratio is one of the main causes of the amount of light spreading, or diffusion that each complex lens creates. A small height/diameter ratio indicates that the diameter is much greater than the height of the lens creating a flatter, wider complex lens. A larger height/diameter value indicates a taller, narrower complex lens.

The divergence of light through the lens may be termed "asymmetric," which means that the divergence in the horizontal direction is different from the divergence in the vertical direction. The divergence curve is asymmetric, meaning that the direction of the peak light transmission is not along the direction $\theta=0°$, but is in a direction non-normal to the surface. "Void" is used herein to mean devoid of added solid and liquid matter, although it is likely the "voids" contain gas.

The viewing angle of a display is calculated by measuring the light intensity at the normal to the display. The angle at which the light intensity drops to 50% of the light intensity of the normal is defined as the viewing angle. Viewing angles are quoted as so: 160° means that 80° off the normal in each direction is where the 50% of the normal intensity lies. It is important in a display system, especially one where there are multiple viewers, to have a very large viewing angle in the horizontal direction because most people will be viewing the display from the same height, but surrounding the display. The vertical viewing angle does not have to be as large because most viewers will be at the same approximate viewing angle. The diffusing optical element 95 can include a viewing angle greater than 160° in a first viewing direction and 100° in a second viewing direction orthogonal to the first direction; or a viewing angle greater than 120° in a horizontal viewing direction and 60° in a vertical viewing direction.

It is preferred to have a viewing angle greater than 160° in the horizontal viewing direction and 100° in the vertical viewing direction. This enables viewers to sit around the display a full 160° and have a good, bright image. A 100° viewing angle in the vertical direction insures that viewers of different heights and seating can view the display.

Preferably, the diffusing optical element 95 includes a gain of at least 1.2. Gain is measured by measuring the light intensity of the system on the normal to the display with and without the diffusing optical element 95. A gain of 1.2 means that, with the diffusing optical element 95, the light intensity at the normal to the display is 1.2 times as bright (has 1.2 times the intensity) than without the diffusing optical element 95. This is achieved by shaping the light and focusing more of it into the center of the display where it is most important to have brightness. In the case of the display system 1 of the current invention, to obtain a gain of 1.2 or greater would be to take some of the light directed out the display in the vertical direction, redirect and shape it to exit the display system 1 on the normal.

A pencil hardness of at least 3H is preferred for the diffusing optical element 95. This insures that the diffusing optical element 95, which is typically the outside surface of the view screen 90, holds up to normal wear and tear. A pencil hardness of 3H will be durable and resist scratches. Pencil hardness can be measured by JIS-K5400 with the aid of a pencil hardness tester under a load of 1 kg, the highest hardness producing no scratch on the film being recorded as test value.

Figure 12:
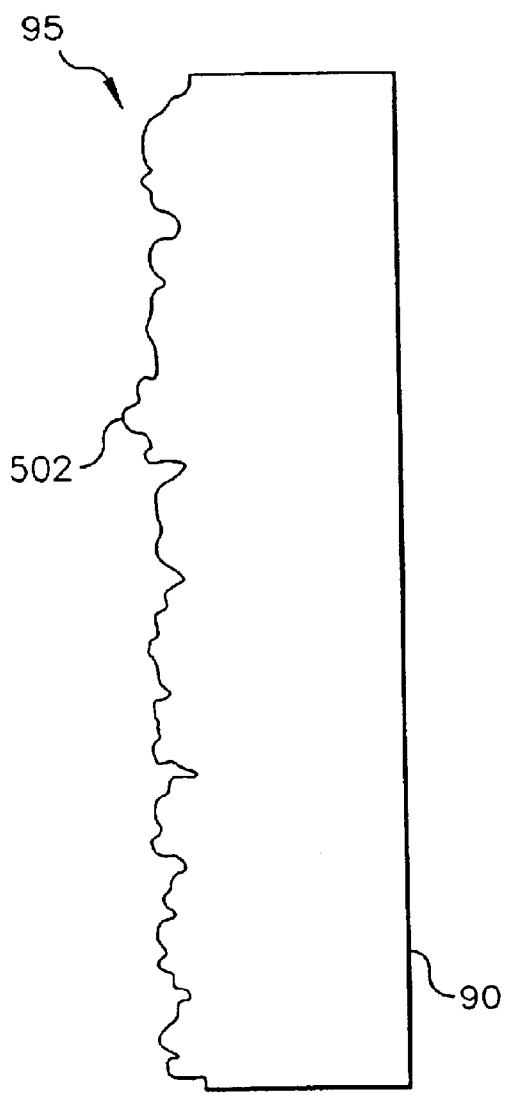
FIG. 12 illustrates a schematic view of a complex lens diffuser integral to a view screen.

The diffusing optical element 95 is preferably integral to the view screen 90. FIG. 12 illustrates the diffusing optical element 95 with complex lenses 502 integral to the view screen 90. When the diffusing optical element 95 is integral to the view screen 90 an interface is eliminated making a more efficient, higher transmission. Furthermore, production steps that form a separate diffusing optical element 95 and adhere it onto the view screen 90 can be eliminated.

Figure 13:
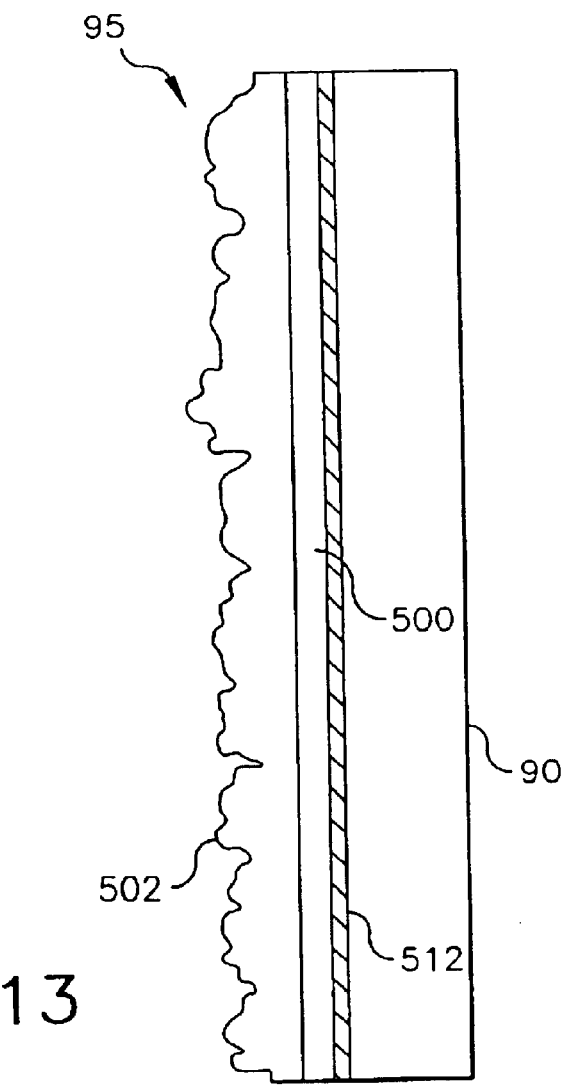
FIG. 13 illustrates a schematic view of a complex lens diffuser adhesively adhered to a view screen.

In another embodiment of the invention, the diffusing optical element 95 is preferably adhesively adhered to the view screen 90. This allows for tailoring of the diffusing optical element 95 to each application and surrounding environment. FIG. 13 illustrates the diffusing optical element 95, including complex lenses 502 upon the substrate 500, adhesively adhered to the view screen 90 with adhesive 512. The diffusing optical element 95 could also be replaced if scratched or damaged making repair costs much smaller than if the entire view screen had to be replaced. The diffusing optical element 95 can be adhesively adhered to the view screen 90 by any adhering method.

Some preferred adhesion methods include pressure sensitive adhesive (PSA), heat activated adhesive, and UV curable adhesives. The adhesive can be permanent or repositionable. The adhesive preferably is coated or applied to the view screen 90 or the diffusing optical element 95. A preferred pressure sensitive adhesive is an acrylic-based adhesive. Acrylic adhesives have been shown to provide an excellent bond between plastics. The preferred adhesive materials may be applied using a variety of methods known in the art to produce thin, consistent adhesive coatings. Examples include gravure coating, rod coating, reverse roll coating, and hopper coating.

Preferably, the diffusing optical element 95 comprises a substrate 500 with a total transmission of greater than 85%. The substrate 500 provides dimensional stability to the diffusing optical element 95 as well as stiffness and thickness to make it well suited to the display system 1. Preferably, the substrate 500 has a light transmission of at least 85%. It has been shown that a substrate 500 with at least 85% light transmission has an acceptable level of transmission to display bright, saturated colors. The most preferred percent transmission of the substrate 500 is at least 92%. A transmission of 92% allows diffusion of and maximizes the brightness of the display significantly improving the image quality of the display when it must compete with natural sunlight.

Preferably, the substrate 500 includes a fringe filter (not shown). A fringe filter is a color correcting filter rather than a notch filter. A fringe filter has been shown to selectively reduce the transmission of specific wavelengths of white light by 25% compared to notch filters which reduce specific wavelength transmission by greater than 90%. Therefore, a fringe filter is ideal for color correction of a white light source for display devices and adjusting the color balance of the illumination light source. A fringe filter does not contain pigment chemistry, which tends to scatter light. Rather the fringe filter is translucent allowing for high light transmission. High light transmission is a critical factor for display devices in that higher light transmission allows for a brighter image. A fringe filter also provides color filtering without the use of dye chemistry, which typically fades from extended exposure to light energy and ultraviolet energy. A fringe filter that does not fade allows the display to provide a consistent color that will not degrade over time.

Diffusing optical elements 95 that contain titanium dioxide particles of less than 30 nanometers, are preferred because the titanium dioxide particles add strength to the diffusing optical elements 95 without significantly changing the transmission or diffusion characteristics of the diffusing optical elements 95. Adding strength and stiffness to the diffusing optical elements 95 is important for transport handling and processing. In small quantities, the addition of nano-$TiO_2$ does not affect the transmission and diffusion characteristics significantly, because the particles are below the wavelength of light and, therefore, do not scatter light.

The diffusing optical element 95 comprising an ultraviolet (UV) curable polymer is preferred. The UV curable polymer begins as an uncured polymer and is subjected to a process that creates diffusing optical elements 95. The sheet is then cured, making it mostly invariable to heat and/or pressure. The diffusing optical elements 95 are, consequently, hard, durable, and resistant to scratching.

Preferably, the diffusing optical element 95 comprises a polyacrylate. In another embodiment of the invention, the diffusing optical elements 95 comprise a polycarbonate. The diffusion optical elements formed out of polycarbonate and polyacrylate have high optical transmission values that allow for high light transmission and diffusion. Polycarbonates and polyacrylates are also very hard and durable to resist scratching and damage, and are relatively inexpensive.

The diffusing optical element 95 preferably comprises a colorant. Hence, a way of color correcting the projected light through the view screen is provided. The colorant can filter out undesirable wavelengths. More preferably, the diffusing optical element 95 comprises dye or pigment. Pigment and dye have excellent color reproduction and color stability. They are able to create a large color gamut and saturation. Furthermore, they are easily incorporated into extrusions and coatings of the polymer layer. Nano-sized pigments can also be used, with the advantage that less of the pigment is needed to achieve the same color saturation, because the pigment particles are so small they are more efficient at adding color.

The diffusing optical elements 95, preferably, have a haze value of at least 70%. This amount of haze is needed to sufficiently diffuse and shape the light as it passes through the diffusing optical element 95. If the diffusing optical element 95 had a haze value of less than 60%, then a percentage of the light transmitted through the projection media would not be deflected and shaped, thereby resulting in a smaller viewing angle.

Preferably, the diffusing optical element 95 has a total transmission of at least 85%. 85% light transmission has an acceptable level of transmission to display bright, saturated colors. The most preferred percent transmission of the diffusing optical elements 95 is at least 92%. A transmission of 92% allows diffusion of and maximizes the brightness of the display, thus, significantly improving the image quality of a display when the display must compete with natural sunlight.

Preferably, the diffusing optical element 95 filters 80% of the light from 400 to 420 nanometers. It has been shown that in some projection display systems with organic lasers, there is a large component of light from 400 to 420 nm. It is desirable to filter this light to get truer, more realistic colors. The diffusing elements preferably use colorants or fringe filters to filter the light from 400 to 420 nanometers.

The diffusing optical element 95, preferably, comprises substantially specular areas of transmission. These specular areas of transmission could be used as a way of branding the display system 1 or as a way of personalization or security. In order to remove the specular areas of transmission, the diffusing optical element 95 would have to be removed, which would destroy the display system 1.

Preferably, color is added to the areas of specular transmission. Multiple colors can be added to each diffusing optical element 95 enabling an interesting and appealing display material. Furthermore, color is easily added at the same time the specular areas are created using dyes that sublimate, and a thermal printer. This is advantageous because there are no registration issues between the areas of color (dye sublimation) and the areas of specular transmission, because they are created at the same time using a printing technique that is inexpensive and already supported by the printing industry. The color added is, preferably, a dye; because dyes are transparent, so the colored areas show up bright and colored when projected.

The diffusing optical elements 95 of the invention can also include, in another aspect, one or more optical coatings to improve optical transmission through one or more lenslet channels. It is preferred to coat a diffuser with a layer of an anti-reflective (AR) coating in order to raise the efficiency of the diffuser. Furthermore, it is preferred to use an anti-reflection coating and/or anti-glare coating to eliminate glare from the display screen. Using an anti-reflection coating and/or anti-glare coating allows for more saturated colors to be displayed.

In one embodiment of the invention, the diffusing optical elements 95 comprise a binder and a light diffusive agent dispersed in the binder. The diffusing optical elements 95 are, preferably, asymmetric polymeric beads 504 upon the substrate 500, as shown in FIGS. 10a and 10b. The asymmetric polymeric beads 504 are typically found in a polymer binder and the size, distribution, and density controls the amount of the diffusion and shaping. Asymmetric polymeric beads 504 can be spherical or aspherical. How thick a polymer the beads 504 are coated in can alter the amount of diffusion. Using these light diffusing elements and binder, the amount of diffusion and shaping of light in a display system can be easily tailored. It is important for the polymeric beads 504 to be asymmetric so that the diffusing optical elements 95 diffuse light more in one direction than the other (e.g., horizontal versus vertical) to create a difference in viewing angles between the two perpendicular directions.

Thermosetting resins such as thermosetting urethane resins consisting of acrylic polyol and isocyanate prepolymer, phenol resins, epoxy resins, unsaturated polyester resins, or the like, and thermoplastic resins such as polycarbonates, thermoplastic acrylic resins, ethylene vinyl acetate copolymer resins, or the like may be included in the diffusing optical element 95. Synthetic resin beads such as polymethyl methacrylate (PMMA) beads, silicone beads, styrene beads, or the like can be used alone or in any combination thereof.

The particle size of the bead, which is properly determined relative to the thickness of the light diffusion layer, may be an average particle size of 1 to 30 micrometers and preferably has a narrow distribution. The diffusing optical element 95 increases the light diffusibility by at least the part of the particles thereof protruding from the surface of the light diffusion layer, the average particle size should be in such a range that part of the particles can protrude from the surface of the light diffusion layer.

Figure 11:
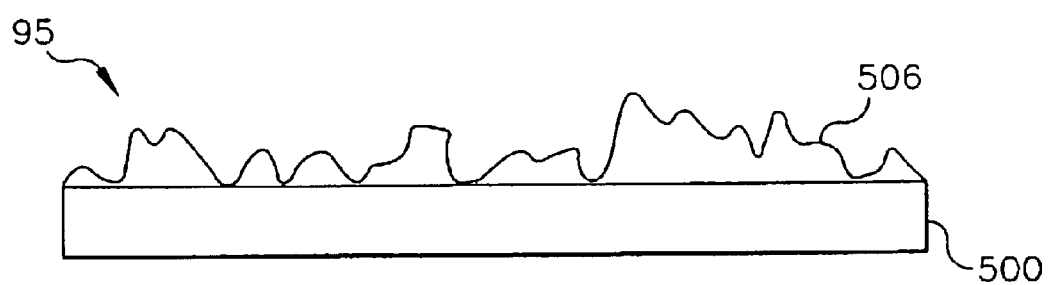
FIG. 11 displays curved surfaces as diffusing optical element 95s with a substrate.

Preferably, the diffusing optical elements 95 are lenses with curved surfaces 506 upon the substrate 500, as shown in FIG. 11. Curved concave and convex polymer lenses have been shown to provide very efficient diffusion of light and high transparency. The lenses can vary in dimensions or frequency to control the amount of diffusion achieved. A high aspect ratio lens would diffuse the light more than a flatter, lower aspect ratio lens and provide a projected darker area through the higher aspect ratio lenses (example 0.8). The lenses are, preferably, asymmetric.

The diffusing optical elements 95 preferably are asymmetrical curved surfaces 506 and have an average aspect ratio of 0.2 to 1.0. The diffused optical elements are asymmetrically curved to direct light in one direction more than another to create a wider viewing angle in one direction than the other. This is useful for a TV application where the desired viewing angle is much larger horizontally than vertically. When the aspect ratio of the diffusing elements is less than 0.1, the amount of curvature is too low to sufficiently diffuse and direct the light transmitted though the diffusing optical element 95 film. When the aspect ratio of the diffusion elements is greater than 1.7, internal reflection occurs and a portion of the incident light is reflected back towards the light source. This lowers the overall transmission and brightness of the display.

In another embodiment of the invention, the diffusing optical elements 95 are preferably complex lenses 502. Complex lenses 502 are lenses on top of other lenses. They have been shown to provide very efficient diffusion of light and high transparency, enabling an efficient diffusion and light shaping. Changing the complexity, geometry, size, or frequency of the complex lenses 502 easily alters the amount of diffusion and shaping.

One embodiment of the present invention could be likened to the moon's cratered surface. Asteroids hitting the moon form craters apart from other craters; overlap a piece of another crater; form within another crater; or engulf other craters. As more craters are carved, the surface of the moon becomes a complexity of depressions like the complexity of lenses formed in the diffusing element.

The complex lenses 502 may differ in size; shape; off-set from an optical axis; and focal length. The curvature, depth, size, spacing, materials of construction (which determines the basic refractive indices of the polymer film and the substrate), and positioning of the lenslets determine the degree of diffusion and light shaping, and these parameters are established during manufacture according to the invention.

The result of using a diffusion film having lenses whose optical axes are off-set from the center of the respective lens results in dispersing light from the film in an asymmetric manner. It will be appreciated, however, that the lens surface may be formed so that the optical axis is off-set from the center of the lens in both the x and y directions. This is used to create different viewing angles in the horizontal and vertical directions.

The lenslet structure can be manufactured on the opposite sides of the substrate 500. The lenslet structures on either side of the substrate 500 can vary in curvature, depth, size, spacing, and positioning of the lenslets.

A diffusing optical element 95 wherein the diffusion efficiency varies more than 5 percent in two different locations of the diffuser is preferred. A diffusion efficiency that varies less than 3 percent could be caused by variations in the diffusion film caused by manufacturing process variations. Most preferred is a diffusion efficiency that varies more than 10 or more than 50 percent in two different locations of the diffuser. It has been shown that over 50 percent variation in two different locations of the diffuser film produces a film that can tailor light diffusing and shaping as a function of placement on a display screen.

A diffusing optical element 95 wherein the diffusion efficiency variation comprises a gradient is preferred. Inclusion of a gradient allows for the smooth transition from more diffusion to less diffusion across the display and can be used in combination with color gradients. The diffusion efficiency of the light diffusing elements can change by printing by the following mathematical variations, for example Diffusion efficiency=$e^{1/distance}$ or $e^{-1/distance}$ (Equation 1)

Diffusion efficiency=1/distance or −1/distance (Equation 2)

Diffusion efficiency=distance*x or −distance*x (where x is a real number) (Equation 3)

Each specific light diffusing application determines the amount of variation needed and the rate at which diffusion efficiency changes with respect to distance.

The concave or convex lenses on the surface of the polymer film are preferably randomly placed. Random placement of lenses increases the diffusion efficiency of the invention materials. Further, by avoiding a concave or convex placement of lenses that is ordered, undesirable optical interference patterns, such as moire that could be distracting to the viewer is avoided.

Preferably, the concave or convex lenses have an average frequency in any direction of from 5 to 250 complex lenses/mm. For film averaging 285 complex lenses/mm, the width of the lenses approach the wavelength of light. The lenses will impart a color to the light passing through the lenses and add unwanted color to the displayed image. Having less than 4 lenses per millimeter creates lenses that are too large and therefore diffuse the light less efficiently. Concave or convex lenses with an average frequency in any direction of between 22 and 66 complex lenses/mm are more preferred. It has been shown that an average frequency of between 22 and 66 complex lenses provide efficient light diffusion and can be efficiently manufactured utilizing cast coated polymer against a randomly patterned roll.

The light diffusion elements have concave or convex lenses at an average width between 3 and 60 microns in the x and y direction. When lenses have sizes below 1 micron, the lenses impart a color shift in the light passing through because the lenses dimensions are on the order of the wavelength of light and add unwanted color to the displayed image. When the lenses have an average width in the x or y direction of more than 68 microns, the lenses are too large to diffuse the light efficiently. More preferred are concave or convex lenses having an average width between 15 and 40 microns in the x and y direction. This size lens has been shown to create the most efficient diffusion and shaping.

The concave or convex complex lenses comprising minor lenses wherein the width in the x and y direction of the smaller lenses is preferably between 2 and 20 microns. When minor lenses have sizes below 1 micron the lenses impart a color shift in the light passing through, because the lenses dimensions are on the order of the wavelength of light and add unwanted color to the displayed image. When the minor lenses have sizes above 25 microns, the diffusion efficiency is decreased, because the complexity of the lenses is reduced. More preferred, are the minor lenses having a width in the x and y direction between 3 and 8 microns. This range has been shown to create the most efficient diffusion.

The number of minor lenses per major lens is preferably from 2 to 60. When a major lens has one or no minor lenses, its complexity is reduced, and therefore, it does not diffuse as efficiently. When a major lens has more than 70 minor lens contained on it, the width of some of the minor lens approaches the wavelength of light and imparts a color to the light transmitted. Most preferred, are from 5 to 18 minor lenses per major lens. This range has been shown to produce the most efficient diffusion.

Preferably, the concave or convex lenses are semi-spherical meaning that the surface of each lenslet is a sector of a sphere, but not necessarily a hemisphere. This provides excellent, even diffusion over the x-y plane. The semi-spherical shaped lenses scatter the incident light uniformly, ideal for a display application where the display area needs to be diffused uniformly.

The complex lenses 502 of the invention preferably comprise polymers. Polymers are preferred as they are generally lower in cost compared to prior art glass lenses, have excellent optical properties and can be efficiently formed into lenses utilizing known processes such as melt extrusion, vacuum forming, and injection molding. Preferred polymers for the formation of the complex lenses include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to improve mechanical or optical properties can be used. Preferred polyamides for the transparent complex lenses include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the complex lenses include cellulose nitrate, cellulose triacetate, cellulose diacetate, cellulose acetate propionate, cellulose acetate butyrate, and mixtures or copolymers thereof. Preferably, polyvinyl resins include polyvinyl chloride, poly (vinyl acetal), and mixtures thereof. Copolymers of vinyl resins can also be utilized. Preferred polyesters for the complex lens of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic, and mixtures thereof. Examples of suitable glycols include ethylene glycol, propylene glycol, butanediol, pentanediol, hexanediol, 1,4-cyclohexanedimethanol, diethylene glycol, other polyethylene glycols, and mixtures thereof.

In another embodiment, the substrate comprises a carbonate repeating unit. Polycarbonates have high optical transmission values compared to polyolefin polymers, and therefore, can improve the brightness of display devices. In another embodiment of the invention, the substrate comprises an olefin repeating unit. Polyolefins are low in cost and have good strength and surface properties. In another embodiment of the invention, the substrate comprises a cellulose acetate. Tri acetyl cellulose has both high optical transmission and low optical birefringence, allowing the diffuser of the invention to both diffuse light and reduce unwanted optical patterns.

The diffusing optical element 95 preferably comprises voided structures. The voided structure can be throughout the diffusing optical element 95, but is preferably in a skin layer on a polymer substrate. Voided structures are less susceptible to scratches, which can affect operating performance. Also, because the voids are typically filled with air, the diffusing optical elements 95 have a high efficiency of diffusing and shaping light. The microvoided layers containing air have a large index of refraction difference between the air contained in the voids (n=1) and the polymer matrix (n=0.2 to 1.8). This large index of refraction difference provides excellent diffusion and high light transmission.

An index of refraction difference between the air void and the thermoplastic matrix is preferably greater than 0.2. An index of refraction difference greater than 0.2 provides excellent diffusion and shaping as well as allows the diffusion to take place in a thin film. The diffusion elements preferably contain at least 4 index of refraction changes greater than 0.2 in the vertical direction. Greater than 4 index of refraction changes provide enough diffusion for a display application. Thirty or more index of refraction differences in the vertical direction, while providing excellent diffusion, significantly reduces the amount of transmitted light, leading to a darker display.

Micro-voided composite biaxially oriented polyolefin sheets are preferred and are manufactured by co-extrusion of the core and surface layer(s), followed by biaxial orientation, whereby voids are formed around void-initiating material contained in the core layer. For the biaxially oriented layer, suitable classes of thermoplastic polymers for the biaxially oriented sheet and the core matrix-polymer of the preferred composite sheet comprise polyolefins. Suitable polyolefins include polypropylene, polyethylene, polymethylpentene, polystyrene, polybutylene, and mixtures thereof. Polyolefin copolymers, including copolymers of propylene, and ethylene such as hexene, butene, and octene are also useful. Polyethylene is preferred, as it is low in cost and has desirable strength properties. Such composite sheets are disclosed in, for example, U.S. Pat. No. 4,377,616 by Ashcraft et al., titled "Lustrous Satin Appearing, Opaque Film Compositions And Method Of Preparing Same" issued Mar. 22, 1983; U.S. Pat. No. 4,758,462 by Park et al., titled "Opaque Film Composites And Method Of Preparing Same" issued Jul. 19, 1988; and U.S. Pat. No. 4,632,869 by Park et al., titled "Resin Composition, Opaque Film And Method Of Preparing Same" issued Dec. 30, 1986, the disclosures of which are incorporated herein for reference. The projection media film comprises a polymer sheet with at least one voided polymer layer and could contain nonvoided polyester polymer layer(s). It should comprise a void space between about 2 and 60% by volume of said voided layer of said polymer sheet. Such a void concentration is desirable to optimize the transmission and reflective properties while providing adequate diffusing power to hide back lights and filaments. The thickness of the micro void-containing oriented film of the present invention is preferably about 1 micrometer to 400 micrometer, more preferably 5 to 200 micrometers.

The diffusing optical element 95 of the invention is preferably provided with one or more nonvoided skin layers adjacent to the microvoided layer. The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core. Any suitable polyester sheet may be utilized for the member provided that it is oriented. The orientation provides added strength to the multi-layer structure that provides enhanced handling properties when displays are assembled. Microvoided oriented sheets are preferred because the voids provide opacity without the use of $TiO_2$. Microvoided layers are conveniently manufactured by co-extrusion of the core and thin layers followed by biaxial orientation, whereby voids are formed around void-initiating material contained in the thin layers.

Polyester microvoided light diffusion elements are also preferred as oriented polyester has excellent strength, impact resistance and chemical resistance. The polyester utilized in the invention should have a glass transition temperature between about 50° C. and about 150° C., preferably about 60–100° C., should be orientable, and have an intrinsic viscosity of at least 0.50, preferably 0.6 to 0.9. Suitable polyesters include those produced from aromatic, aliphatic, or cyclo-aliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoiso-phthalic, and mixtures thereof. Examples of suitable glycols include ethylene glycol, propylene glycol, butanediol, pentanediol, hexanediol, 1,4-cyclohexanedimethanol, diethylene glycol, other polyethylene glycols, and mixtures thereof. Such polyesters are well known in the art and may be produced by well-known techniques, e.g., those described in U.S. Pat. No. 2,465,319 by Whinfield, et al, titled "Polymeric Linear Terephthalic Esters" issued Mar. 22, 1949; and U.S. Pat. No. 2,901,466 by Kibler, et al., titled "Linear Polyesters And Polyester-Amides From 1,4-Cyclohexanedimethanol" issued Aug. 25, 1959. Preferred continuous matrix polymers are those having repeat units from terephthalic acid or naphthalene dicarboxylic acid and at least one glycol selected from ethylene glycol, 1,4-butanediol, and 1,4-cyclohexanedimethanol. Poly(ethylene terephthalate), which may be modified by small amounts of other monomers, is especially preferred. Polypropylene is also useful. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. No. 4,420,607 by Morris et al., titled "Polyesters Of Trans-4,4-Stilbenedicarboxylic Acid, Terephthalic Acid Or 2,6-Naphthalenedicarboxylic Acid, And 1,2-Propanediol" issued Dec.13, 1983; U.S. Pat. No. 4,459,402 by Morris et al., titled "Copolyesters Comprising Repeating Units From Trans-4,4'-Stilbenedicarboxylic Acid, Terephthalic Acid And/Or 2,6-Naphthaienedicarboxylic Acid, And 1,4-Butanediol" issued Jul. 10, 1984; and U.S. Pat. No. 4,468,510 by Morris et al., titled "Polyesters Of Trans-4,4'-Stilbenedicarboxylic Acid, Terephthalic Acid Or 2,6-Naphthalenedicarboxylic Acid, 1,2-Propanediol And 1,3-Propanediol" issued Aug. 28, 1984.

The co-extrusion, quenching, orienting, and heat setting of polyester diffuser sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers, while restraining to some degree the sheet against retraction in both directions of stretching.

The microvoid-containing oriented film of the present invention has a function to diffuse the light. The micro void forms a diffraction grating-like structure that scatters the light. The structure has a periodically varying refractive index distribution. The voided thermoplastic diffuser sheet provides excellent scattering of light while having a high % light transmission. The void-initiating particles which remain in the finished packaging sheet core should be from 0.1 to 10 micrometers in diameter, to produce voids of the desired shape and size. Voids can be asymmetrical to produce different viewing angles in the horizontal and vertical directions or can be substantially circular to spread light evenly. Voids resulting from the use of initiating particles of this size are termed "microvoids" herein. The voids exhibit a dimension of 10 micrometers or less in the unoriented thickness or Z direction of the layer. The size of the void is also dependent on the degree of orientation in the machine and transverse directions. Ideally, the void would assume a shape that is defined by two opposed and edge contacting concave disks. In other words, the voids tend to have a substantially circular cross-section in the plane perpendicular to the direction of the light energy, (also termed the vertical direction herein). The voids are oriented so that the two major dimensions (major axis and minor axis) are aligned with the machine and transverse directions of the sheet. The Z-direction axis is a minor dimension and is roughly the size of the cross-diameter of the voiding particle. The voids generally tend to be closed cells, and thus, there is virtually no path open from one side of the voided-core to the other side through which gas or liquid can traverse.

Voids whose major axis to minor axis is between 4.0 and 0.5 are preferred, as they have been shown to provide efficient diffusion of light energy, reduce uneven diffusion of light energy, and shape light. A major axis diameter to minor axis diameter ratio of less than 2.0 is preferred. A ratio of less than 2.0 has been shown to provide excellent even diffusion of light sources. Further, a ratio greater than 3.0 yields voids that are aspherical and aspherical voids have been shown to provide uneven dispersion of light to create view angle differences.

A microvoid is a void in the polymer layer of the diffuser that has a volume less than 100 micrometers. Microvoids larger than 100 micrometers are capable of diffusing visible light, however, because the void size is large, uneven diffusion of the light occurs resulting in uneven lighting of display devices. A thermoplastic microvoid volume between 8 and 42 cubic micrometers is preferred. A microvoid volume less than 6 cubic micrometers is difficult to obtain as the voiding agent required for 6 cubic micrometers is too small to void with a typical 3×3 orientation of polyester. A microvoid volume greater than 50 cubic micrometers, while providing diffusion, creates a thick diffusion layer requiring extra material and cost. The most preferred void volume for the thermoplastic diffuser is between 10 and 20 cubic micrometers. Between 10 and 20 cubic micrometers has been shown to provide excellent diffusion and transmission properties.

Methods of bilaterally orienting sheet or film material are well known in the art. Basically, such methods comprise stretching the sheet or film at least in the machine or longitudinal direction after it is cast or extruded an amount of about 1.5–10 times its original dimension. Such sheet or film may also be stretched in the transverse or cross-machine direction by apparatus and methods well known in the art, in amounts of generally 1.5–10 times the original dimension, (usually 3–4 times for polyesters and 6–10 times for polypropylene). Such apparatus and methods are well known in the art and are described in U.S. Pat. No. 3,903,234 by Ikeda et al., titled "Process For Preparing Filled, Biaxially Oriented, Polymeric Film" issued Sep. 2, 1975.

The voids, or void spaces, referred to herein surrounding the microbeads, are formed as the continuous matrix polymer is stretched at a temperature above the temperature of the matrix polymer. The microbeads of cross-linked polymer are relatively hard compared to the continuous matrix polymer. Also, due to the incompatibility and immiscibility between the microbead and the matrix polymer, the continuous matrix polymer slides over the microbeads as it is stretched, causing formation of voids, at the sides, in the direction or directions of stretch, and elongation as the matrix polymer continues to be stretched. Thus, the final size and shape of the voids depends on the direction(s) and amount of stretching. If stretching is only in one direction, microvoids will form at the sides of the microbeads in the direction of stretching. If stretching is in two directions (bi-directional stretching), such stretching has vector components extending radially from any given position that results in a doughnut-shaped void surrounding each microbead.

The preferred preform stretching operation simultaneously opens the microvoids and orients the matrix material. The final product properties depend on and can be controlled by stretching time-temperature relationships and on the type and degree of stretch. For maximum opacity and texture, the stretching is done just above the glass transition temperature of the matrix polymer. When stretching is done in the neighborhood of the higher glass transition temperature, both phases may stretch together and opacity decreases. In the former case, the materials are pulled apart during a mechanical anticompatibilization process.

Additional layers preferably are added to the microvoided polyester diffusion sheet that may achieve added utility. Such layers might contain tints, antistatic materials, or different void-making materials to produce sheets of unique properties. Biaxially oriented sheets could be formed with surface layers that would provide an improved adhesion. The biaxially oriented extrusion could be carried out with as many as 10 layers, if desired, to achieve some particular desired property. Addenda are preferably added to a polyester skin layer to change the color of the imaging element. Colored pigments that can resist extrusion temperatures greater than 320° C. are preferred, as temperatures greater than 320° C. are necessary for co-extrusion of the skin layer.

Addenda of this invention could be an optical brightener. An optical brightener is a substantially colorless, fluorescent, organic compound that absorbs ultraviolet light and emits it as visible blue light. Examples include, but are not limited to, derivatives of 4,4'-diaminostilbene-2,2'-disulfonic acid, coumarin derivatives such as 4-methyl-7-diethylaminocoumarin, 1–4-Bis(O-Cyanostyryl) Benzol and 2-Amino-4-Methyl Phenol. An optical brightener can be used in a skin layer, leading to more efficient use of the optical brightener.

The polyester light diffusion elements may be coated or treated after the co-extrusion and orienting process or between casting and full orientation, with any number of coatings which may be used to improve the properties of the sheets including printability, to provide a vapor barrier, to make them heat sealable, or to improve adhesion. Examples are acrylic coatings for printability, and coating polyvinylidene chloride for heat seal properties. Further examples include: flame, plasma, or corona discharge treatment to improve printability or adhesion. By having at least one nonvoided skin on the microvoided core, the tensile strength of the sheet is increased and makes it more manufacturable. It allows the sheets to be made at wider widths and higher draw ratios than when sheets are made with all layers voided. The non-voided layer(s) can be peeled off after manufacture of the film. Co-extruding the layers further simplifies the manufacturing process.

The diffusing optical elements 95 are preferably a surface diffuser. A surface diffuser utilizes its rough surface exposed to air, thereby affording the largest possible difference in index of refraction between the material of the diffuser and the surrounding medium; and consequently, the largest angular spread for incident light and very efficient diffusion. Diffusion optical elements 95 that include a surface microstructure are preferred. A surface microstructure is easily altered in design of the surface structures; for example, the surface microstructure can be altered with heat and/or pressure to achieve a macro diffusion efficiency variation. Microstructures can be tuned for different diffusion efficiencies and how they shape light. Examples of microstructures are simple or complex lenses, prisms, pyramids, and cubes. The shape, geometry, and size of the microstructures can be changed to accomplish the desired diffusion change.

In another embodiment of the invention, a bulk diffuser is preferred. A bulk diffuser can be manufactured with a macro diffusion efficiency variation, or can be subjected to heat and/or pressure to produce the variation. Further, the bulk diffuser relies on index of refraction changes through the film, while not needing an air interface to work efficiently.

The diffusing optical element 95 preferably comprises nano-clay. The present invention is an article, which uses layered materials such as smectite clay, preferably intercalated with an organic material having a hydrophilic component, and more preferably an additional oleophilic component. The aforesaid organic material can comprise a surfactant, an ethoxylated alcohol and/or a block co-polymer. The intercalated clay creates several index of refraction changes which diffuse visible light. The addition of the intercalated clay material to a bulk polymer layer improves the mechanical strength of the polymer sheet thereby increasing the scratch resistance of the sheet and improving the stiffness of the sheet, thus allowing thinner, lower weight materials to be used. Thinner, lower weight materials reduce the weight and size of display devices resulting in smaller and lighter devices. The intercalated clay materials of the invention also improves the thermal properties of the base polymer making the invention materials more thermally and optically stable at temperatures encountered in a hot car or in a military vehicle such as a tank. Thermal and optical stability increases the environmental range in which display devices can be utilized. These and other advantages will be apparent from the detailed description below.

The optical component of the invention, preferably, has particulate layered materials with an aspect ratio between 10:1 and 1000:1. The aspect ratio of he layered material, defined as the ratio between the lateral dimension (i.e., length or width) and the thickness of the particle, is an important factor in the amount of light diffusion. An aspect ratio much less than 8:1 does not provide enough light diffusion. An aspect ratio much greater than 1000:1 is difficult to process.

The layered materials are preferably present in an amount between 1 and 10% by weight of the binder. Layered materials that are present in an amount less than 0.9% by weight of the binder have been shown to provide very low levels of light diffusion. Layered materials in an amount over 11% have been shown to provide little increase in light diffusion while adding unwanted color to the binder, hence, coloring the transmitted light. Layered materials that are present in an amount between 2 and 5% by weight of the binder are most preferred as the visible light diffusion is high, while avoiding unwanted coloration and additional expense of additional materials. Further, layered materials present in the amount from 2 to 5% have been shown to provide excellent light diffusion for specular backlight assemblies, such as those found in liquid crystal displays.

In another embodiment of the invention, the layered materials are present in an amount between 0.1 and 1% by weight of said binder. By providing the layered materials between 0.1 and 1% by weight, an optical element with a high light transmission (greater than 90%) and a low haze (less than 10%) results, allowing the optical element to be used an external light diffuser with anti-glare properties. An anti-glare optical element reduces the glare created by ambient light, such as sunlight, which impacts the quality of the transmitted image.

In another embodiment of the invention, the optical component comprises two or more layers. By providing additional layers, to the optical element, improvements to the optical element such as anti-static properties, and light filtering properties can be accomplished in the additional layers. By providing a multiple layered optical element, the layered materials of the invention can be added to a specific location to control the focal length of the diffused light. It has been shown that by adding the layered materials of the invention to different layers in the optical component, the light intensity as a function of viewing angle can be changed; thus, allowing the invention materials to be customized to optimize an optical system. For example, 2% weight addition of the layered materials of the invention can be added to an outermost layer of a 125 micrometer optical element. If the outermost layer containing the layered materials is oriented toward a light source, the diffused light intensity as a function of angle will be small at the normal, compared to the case where the outermost layer is oriented away from the light source. The optical element preferably can have several layers containing different weight % addition of the layered materials of the invention to create a light diffusion gradient in the direction of the light travel.

The layered materials suitable for this invention can comprise any inorganic phase, desirably comprising layered materials in the shape of plates, with a significantly high aspect ratio. However, other shapes with a high aspect ratio will also be advantageous, as per the invention. The layered materials suitable for this invention include phyllosilicates, e.g., montmorillonite particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials include illite, mixed layered illite/smectite minerals, such as ledikite and admixtures of illites with the clay minerals named above. Other useful layered materials, and particularly useful with anionic matrix polymers, are the layered double hydroxides or hydrotalcites, such as $Mg_6Al_{3.4}(OH)_{18.8}(CO_3)_{1.7}H_2O$, which have positively charged layers and exchangeable anions in the interlayer spaces. Other layered materials having little or no charge on the layers may be useful, provided they can be intercalated with swelling agents, which expand their interlayer spacing. Such materials include chlorides such as $FeCl_3$, $FeOCl$, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag doped $V_2O_5$, $W_{0.2}V_{2.8}O7$, $Cr_3O_8$, $MoO_3(OH)_2$, $VOPO_4$-$2H_2O$, $CaPO_4CH_3$—$H_2O$, $MnHAsO_4$—$H_2O$, $Ag_6Mo_{10}O_{33}$ and the like. Preferred layered materials are swellable so that other agents, usually organic ions or molecules, can intercalate and/or exfoliate the layered material resulting in a desirable dispersion of the inorganic phase. These swellable layered materials include phyllosilicates of the 2:1 type, as defined in clay literature (vide, for example, "An introduction to clay colloid chemistry," by H. van Olphen, John Wiley & Sons Publishers). Typical phyllosilicates with ion exchange capacity of 50 to 300 milliequivalents per 100 grams are preferred. Preferred layered materials for the present invention include smectite clay such as montmorillonite, nontronite, beidellite, volkonskoite, hectorite, saponite, sauconite, sobockite, stevensite, svinfordite, halloysite, magadiite, kenyaite, and vermiculite as well as layered double hydroxides or hydrotalcites. Most preferred smectite clays include montmorillonite, hectorite, and hydrotalcites, because of commercial availability of these materials.

The aforementioned smectite clay can be natural or synthetic. This distinction can influence the particle size and/or the level of associated impurities. Typically, synthetic clays are smaller in lateral dimension, and therefore possess smaller aspect ratio. However, synthetic clays are purer and are of narrower size distribution, compared to natural clays and may not require any further purification or separation. For this invention, the smectite clay particles should have a lateral dimension of between 0.01 $\mu$m and 5 $\mu$m, and preferably between 0.05 $\mu$m and 2 $\mu$m, and more preferably between 0.1 $\mu$m and 1 $\mu$m. The thickness or the vertical dimension of the clay particles can vary between 0.5 nm and 10 nm, and, preferably, between 1 nm and 5 nm. The aspect ratio, which is the ratio of the largest and smallest dimension of the clay particles should be between 10:1 and 1000:1 for this invention. The aforementioned limits regarding the size and shape of the particles are to ensure adequate improvements in some properties of the nanocomposites without deleteriously affecting others. For example, a large lateral dimension may result in an increase in the aspect ratio, a desirable criterion for improvement in mechanical and barrier properties. However, very large particles can cause optical defects due to deleterious light scattering, and can be abrasive to processing, conveyance, and finishing equipment as well as to other components.

The concentration of smectite clay in the optical component of the invention can vary as per need; however, it is preferred to be <10% by weight of the binder. Significantly higher amounts of clay can impair physical properties of the optical component by rendering it brittle, as well as difficult to process. On the other hand, too low a concentration of clay may fail to achieve the desired optical effect. It is preferred that the clay concentration be maintained between 1 and 10%, and between 1.5 and 5% for optimum results.

The smectite clay materials, generally require treatment by one or more intercalants to provide the required interlayer swelling and/or compatibility with the matrix polymer. The resulting interlayer spacing is critical to the performance of the intercalated layered material in the practice of this invention. As used herein the "inter-layer spacing" refers to the distance between the faces of the layers as they are assembled in the intercalated material before any delamination (or exfoliation) takes place. The preferred clay materials generally include interlayer or exchangeable cations such as Na+, Ca+2, K+, Mg+2, and the like. In this state, these materials do not delaminate in host polymer melts, regardless of mixing, because their interlayer spacings are usually very small (typically equal to or less than about 0.4 nm) and consequently the interlayer cohesive energy is relatively strong. Moreover, the metal cations do not aid compatibility between layers and the polymer melt.

In the present invention, the smectite clays are preferably intercalated by swelling agent(s) or intercalant(s), to increase interlayer distances to the desired extent. In general, the interlayer distance should be at least about 0.5 nm, preferably at least 2 nm, as determined by X-ray diffraction. The clay to swelling agent or intercalant weight ratio may vary from 0.1:99.9 and 99.9:01, but preferably between 1:99 and 90:10, and more preferably between 20:80 and 80:20.

The swelling agent or intercalant can be an organic material, preferably comprising a hydrophilic component, and more preferably, also comprising an oleophilic component. It is believed that the hydrophilic component participates in intercalation and the oleophilic component participates in compatibilization of the smectite clay. The aforesaid organic material can comprise a surfactant, a block co-polymer and/or an ethoxylated alcohol. In a most preferred embodiment, the aforesaid organic material is a block copolymer or an ethoxylated alcohol, similar to those disclosed in U.S. patent application Ser. No. 82,859; 82,857; and 82,056, incorporated herein by reference.

The preferred block copolymers of the invention are amphiphilic and have a hydrophilic and an oleophilic component. Further, the block copolymers of the invention can be of the two block or "A-B" type, where A represents the hydrophilic component, and B represents the oleophilic component; or of the three block or "A-B-A" type. For example, the block copolymer may comprise three blocks and the matrix may comprise a copolymer or a blend of polymers compatible with at least one block of the copolymer. Also, where the matrix is a blend of polymers, individual polymers in the blend may be compatible with separate blocks of the copolymers. One presently preferred class of polymeric components that is useful for the hydrophilic component in this invention is poly(alkylene oxides), such as poly(ethylene oxide). The term poly(alkylene oxides), as used herein, includes polymers derived from alkylene oxides such as poly(ethylene oxides) including mixtures of ethylene and propylene oxides. The most preferred is poly(ethylene oxide), because of its effectiveness in the present invention, its well-known ability to intercalate clay lattices through hydrogen bonding and ionic interactions, as well as its thermal processability and lubricity. The term poly(alkylene oxides) as used herein includes polymers derived from alkylene oxides, such as poly(ethylene oxides), including mixtures of ethylene and propylene oxides. The most preferred is poly(ethylene oxide), mainly because of its effectiveness in the present invention; its commercial availability in a range of molecular weights and chemistries, hence, affording a wide latitude in the synthesis of the block copolymers.

The diffusing optical element 95 of the present invention may be used in combination with a film or sheet made of a transparent polymer. Examples of such polymer are polyesters such as polycarbonate, polyethylene terephthalate, polybutylene terephthalate, and polyethylene naphthalate; acrylic polymers such as polymethyl methacrylate, polyethylene, polypropylene, polystyrene, polyvinyl chloride, polyether sulfone, polysulfone, polyarylate, and triacetyl cellulose. The projection media may be mounted to a glass sheet for support.

The diffusing optical element 95 of the present invention may be incorporated with an additive or a lubricant such as silica for improving the drawability and the surface-slipperiness of the film, for example. The additive or a lubricant should not deteriorate the optical characteristics of the diffusing optical element 95. Examples of such additives are organic solvents such as xylene, alcohols or ketones, fine particles of an acrylic resin, silicone resin, metal oxide or a filler.

The diffusion optical element 95 may be coated or treated before or after thermoplastic lenslet casting with any number of coatings which may be used to improve the properties of the sheets, including printability; to provide a vapor barrier; to make it heat sealable; or to improve adhesion. Examples are acrylic coatings for printability, and polyvinylidene chloride coatings for heat sealing properties. Further examples include flame, plasma, or corona discharge treatment to improve printability or adhesion.

The diffusing optical element 95 of the invention may also be used in conjunction with a light diffuser, for example a bulk diffuser, a lenticular layer, a beaded layer, a surface diffuser, a holographic diffuser, a micro-structured diffuser, another lens array, or various combinations thereof. The lenslet diffuser film disperses, or diffuses the light, thus destroying any diffraction pattern that may arise from the addition of an ordered periodic lens array.

The diffusing optical element 95 can also include, in another aspect, one or more optical coatings to improve optical transmission through one or more lenslet channels. It is often desirable to coat a diffuser with a layer of an anti-reflective (AR) coating in order to raise the efficiency of the diffuser.

The thickness of the diffusing optical elements 95, preferably, is not greater than 250 micrometers or, more preferably, from 25 to 150 micrometers. When the diffusing optical elements 95 are 25–150 micrometers thick, they are easy to handle, have stability, and can easily be processed. When the projection film is over 250 micrometers thick, less light is transmitted through the film causing a dimmer displayed image. Further, by reducing the thickness of the diffusing optical element 95, the materials content of the diffusion elements are reduced.

Since the diffusing optical elements 95 of the invention typically are used in a display system, the diffusing optical elements 95 with an elastic modulus greater than 500 MPa is preferred. Further, because the diffusing optical elements 95 are mechanically tough, it is better able to withstand the rigors of handling and processing. A diffusing optical element 95 with an impact resistance greater than 0.6 GPa is preferred. An impact resistance greater than 0.6 GPa allows the diffusing optical element 95 to resist scratching and mechanical deformation.

The diffusing optical elements 95 of the present invention also have significant architectural uses such as providing appropriate light for work and living spaces. In typical commercial applications, inexpensive transparent polymeric diffuser films are used to help diffuse light over the room. Embodiments of the invention may provide not only an improved viewing angle of a display system and diffuse the light, but may also be used to create unique and interesting display media.

The invention has been described in detail with particular reference to certain preferred embodiments thereof, but it will be understood that variations and modifications can be effected within the spirit and scope of the invention.

Parts List 1 display system
1a red organic laser device
1b green organic laser device
1c blue organic laser device
5 viewer
10B blue light beam
10G green light beam
10R red light beam
20a red light beam reflector
20b dichroic mirror
20c dichroic mirror
40 electrooptic deflector
50 wobble mirror
60 galvanometer mirror
65 optical mirrors
70 lenses
80 rotating polygon mirror
90 view screen
91 display
95 diffusing optical element
100 laser beam path
200 linear laser array
205 light
210 activated laser array pixels
220 optical system components
240 image of the line of activated laser array pixels
270 image of laser array pixels on view screen
290 waveguide display component
292 waveguide
300 organic laser device Parts List-continued 320 substrate
330 bottom dielectric stack
340 organic active region 345 etched region
350 top dielectric stack
360 pump beam
370 laser emission
375 organic spacer layer
385 periodic gain region
500 substrate
502 complex lenses
504 asymmetric polymeric beads
506 curved surfaces
512 adhesive

What is claimed is:

1. A display system for providing a user viewable visible image, comprising:
   a) a view screen for receiving organic laser light and having a diffusing optical element so that the view screen, in response to organic laser light, produces a viewable visible image, wherein the diffusing optical element includes a viewing angle greater than 120° in a first viewing direction and greater than 60° in a second viewing direction orthogonal to the first viewing direction;
   b) one or more organic laser light sources arranged in an array with each or the laser light sources including a vertical cavity design having:
      i) a first dielectric stack for receiving and transmitting pump beam light and being reflective to laser light over a predetermined range of wavelengths;
      ii) an organic active region for receiving transmitted pump beam light from the first dielectric stack and emitting the laser light; and
      iii) a second dielectric stack for reflecting transmitted pump beam light and laser light from the organic active region back into the organic active region, wherein a combination of the first and the second dielectric stacks and the organic active region produces the laser light;
   c) means for projecting and modulating intensity of the organic laser light from the array onto the view screen in a pattern to cause a visual image to be produced by the view screen; and
   d) means associated with the view screen for reducing speckle in the organic laser light.

2. The display system claimed in claim 1, wherein the diffusing optical element includes a viewing angle greater than 160° in a horizontal viewing direction and greater than 100° in a vertical viewing direction.

3. The display system claimed in claim 1, wherein the diffusing optical element includes a gain of at least 1.2.

4. The display system claimed in claim 1, wherein the diffusing optical element has a pencil hardness of at least 3H.

5. The display system claimed in claim 1, wherein the diffusing optical element is integral to the view screen.

6. The display system claimed in claim 1, wherein the diffusing optical element is adhesively adhered to the view screen.

7. The display system claimed in claim 1, wherein the diffusing optical element includes a substrate with a total transmission of greater than 85 percent.

8. The display system claimed in claim 7, wherein the substrate comprises a fringe filter.

9. The display system claimed in claim 1, wherein the diffusing optical element further comprises complex lenses.

10. The display system claimed in claim 1, wherein the diffusing optical element further comprises asymmetric polymeric beads.

11. The display system claimed in claim 1, wherein the diffusing optical element further comprises curved surfaces.

12. The display system claimed in claim 1, wherein the diffusing optical element further comprises asymmetrical curved surfaces with average aspect ratios from 0.2 to 1.0.

13. The display system claimed in claim 1, wherein the diffusing optical element further comprises voided structures.

14. The display system claimed in claim 1, wherein the diffusing optical element further comprises nano-clay.

15. The display system claimed in claim 1, wherein the diffusing optical element contains titanium dioxide particles less than 30 nanometers.

16. The display system claimed in claim 1, wherein the diffusing optical element comprises an ultraviolet curable polymer.

17. The display system claimed in claim 1, wherein the diffusing optical element comprises a polycarbonate.

18. The display system claimed in claim 1, wherein the diffusing optical element comprises a polyacrylate.

19. The display system claim in claim 1, wherein the diffusing optical element contains a colorant.

20. The display system claim in claim 1, wherein the diffusing optical element contains a dye or pigment.

21. The display system claimed in claim 1, wherein the diffusing optical element has a haze of at least 70 percent.

22. The display system claimed in claim 1, wherein the diffusing optical element has a light transmission of at least 85 percent.

23. The display system claimed in claim 1, wherein the diffusing optical element filters 80 percent of light from 400 to 420 nanometers.

24. The display system claimed in claim 1, wherein selective areas of the diffusing optical element are substantially specular in transmission.

25. The display system claimed in claim 1, wherein the diffusing optical element contains an anti-reflection coating.

26. The display system of claim 1 wherein the one or more organic laser light sources produce substantially similar wavelengths of light thereby creating a monochrome display.

27. The display system of claim 1 wherein the one or more organic laser light sources produce substantially different wavelengths of light thereby creating a color display.

28. The display system of claim 1 wherein the projecting means includes a moveable mirror which illuminates the view screen a line at a time with organic laser light produced by the one or more organic laser light sources.

29. The display system of claim 28 wherein the moveable mirror is mounted on a polygon.

30. The display system of claim 28 wherein the projecting means includes an acousto-optic deflector device.

31. The display system of claim 28 wherein the projecting means includes an electro-optic device.

32. The display system of claim 28 wherein the projecting means includes a micromechanical device.

33. The display system of claim 28 wherein the projecting means includes a digital micromirror device.

34. The display system of claim 28 wherein the projecting means includes a micrograting device.

35. The display system of claim 27 wherein the array of one or more organic laser light sources includes one or more of pixels wherein each pixel is defined by three or more organic laser light sources respectively producing red, green, and blue light.

36. The display system of claim 27 wherein the array includes three separate linear arrays, each producing a different color with each of the separate linear arrays having a one or more organic laser light source producing the same color.

37. The display system of claim 1 further including a waveguide display component for receiving projected organic laser light and directing it onto the view screen.

38. The display system of claim 1 wherein the speckle reduction means includes an optical mirror and means for moving such optical mirror.

39. The display system of claim 1 wherein the speckle reduction means includes means for oscillating the diffusing element.

40. The display system of claim 1 wherein the intensity modulating means includes an acousto-optic modulator.

41. The display system of claim 1 wherein the intensity modulating means includes an electro-optic modulator.

42. The display system of claim 1 wherein each of the one or more organic laser light sources is driven by pump beam light and the display system further includes means for varying intensity of the pump beam light.

* * * * *